United States Patent
Osawa et al.

(10) Patent No.: US 10,571,759 B2
(45) Date of Patent: Feb. 25, 2020

(54) DISPLAY DEVICE AND INTER-SUBSTRATE CONDUCTING STRUCTURE

(71) Applicant: Japan Display Inc., Tokyo (JP)

(72) Inventors: Shuichi Osawa, Tokyo (JP); Shoji Hinata, Tokyo (JP); Yoshikatsu Imazeki, Tokyo (JP); Yoichi Kamijo, Tokyo (JP); Yoshihiro Watanabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 73 days.

(21) Appl. No.: 15/879,860

(22) Filed: Jan. 25, 2018

(65) Prior Publication Data
US 2018/0210262 A1    Jul. 26, 2018

(30) Foreign Application Priority Data

Jan. 26, 2017 (JP) ................. 2017-012120

(51) Int. Cl.
*G02F 1/1345* (2006.01)
*G02F 1/1333* (2006.01)

(52) U.S. Cl.
CPC ........ *G02F 1/13452* (2013.01); *G02F 1/1345* (2013.01); *G02F 1/13338* (2013.01); *G02F 1/133345* (2013.01); *G02F 2201/42* (2013.01)

(58) Field of Classification Search
CPC ............................... G02F 1/133345
See application file for complete search history.

(56) References Cited

U.S. PATENT DOCUMENTS

| | | | | |
|---|---|---|---|---|
| 2011/0316810 A1* | 12/2011 | Tsujino | ............... | G02F 1/13338 345/174 |
| 2012/0261179 A1* | 10/2012 | Yamamoto | ........ | H01L 23/49827 174/264 |
| 2013/0285253 A1* | 10/2013 | Aoki | ................. | H01L 21/76251 257/774 |
| 2015/0207100 A1* | 7/2015 | Saito | ................... | H01L 51/5246 257/40 |
| 2015/0263314 A1* | 9/2015 | Sakuishi | ............. | H01L 51/0097 438/28 |

FOREIGN PATENT DOCUMENTS

| | | | | |
|---|---|---|---|---|
| JP | 2002-040465 A | 2/2002 | | |
| JP | 2010-232249 | * 10/2014 | ............... | H05F 3/46 |
| JP | WO/2017/094457 | * 8/2017 | ............... | G09F 9/30 |

* cited by examiner

*Primary Examiner* — Sang V Nguyen
(74) *Attorney, Agent, or Firm* — K&L Gates LLP

(57) ABSTRACT

According to one embodiment, a display device includes a first substrate including a first basement and a first terminal, a second substrate opposing the first substrate and including a second basement and a second terminal, an organic insulating layer located between the first basement and the second basement, a first hole penetrating the second basement and the organic insulating layer, a second hole penetrating at least one of the second basement and the organic insulating layer and communicating to the first hole and a connecting material provided at least one of the first hole and the second hole to electrically connect the first terminal and the second terminal to each other.

18 Claims, 17 Drawing Sheets

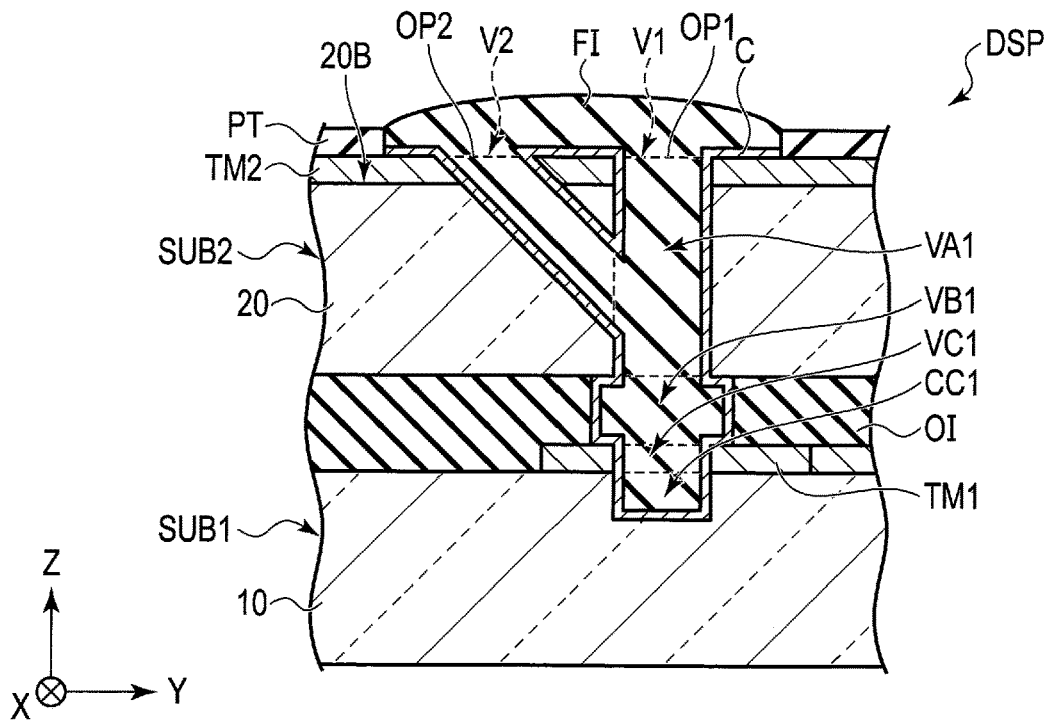
F I G. 2
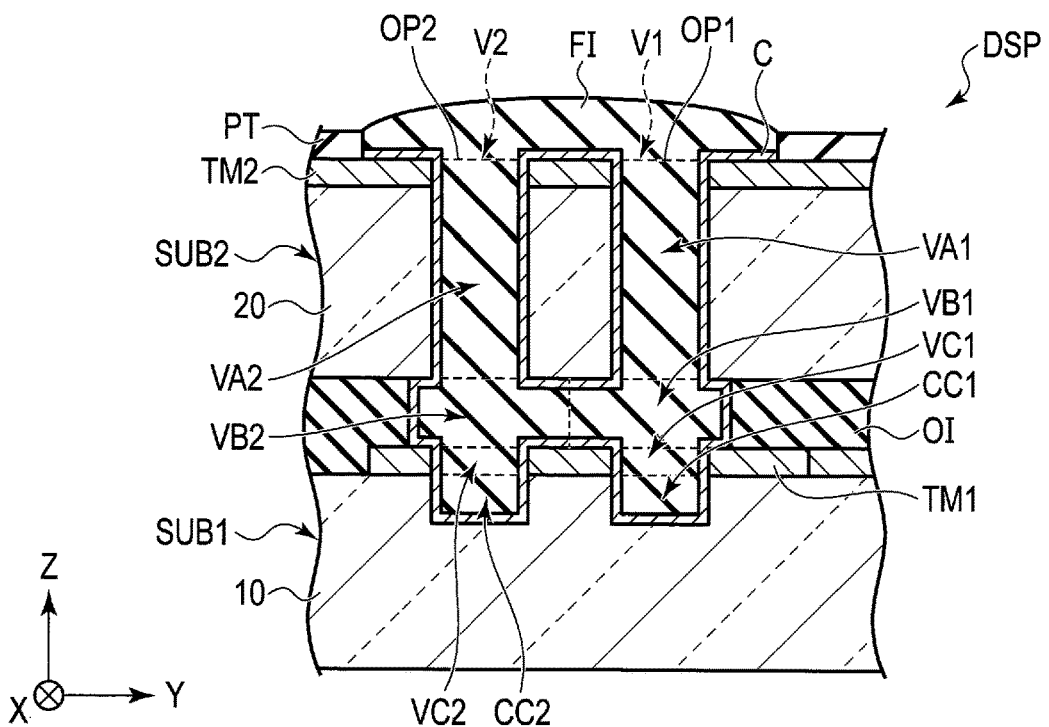
F I G. 3

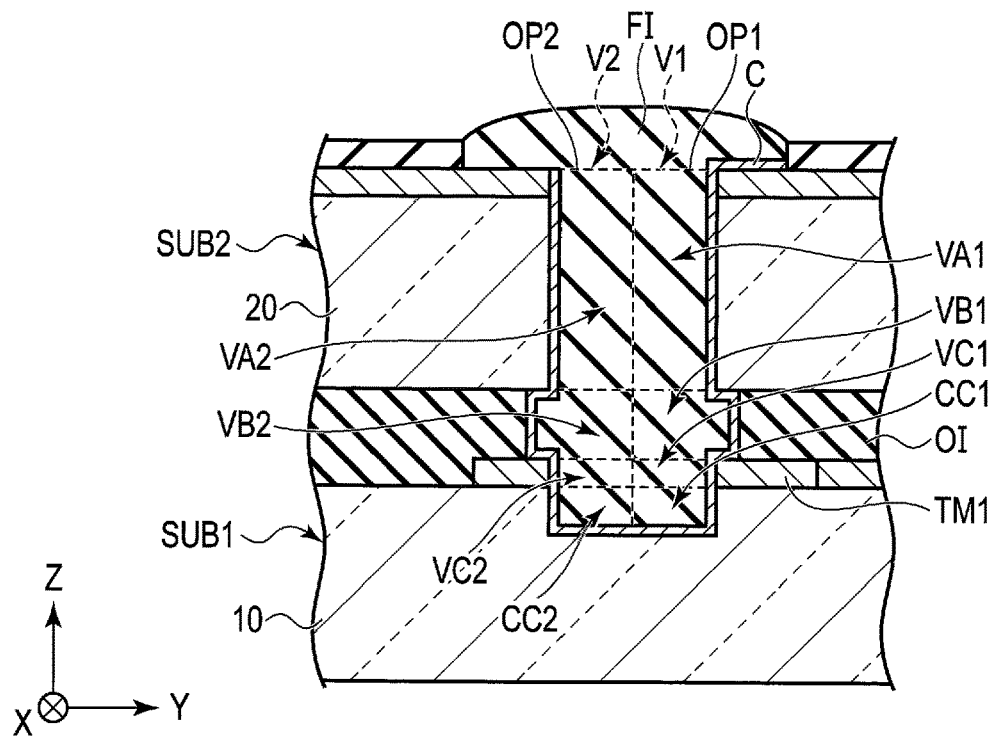
F I G. 4
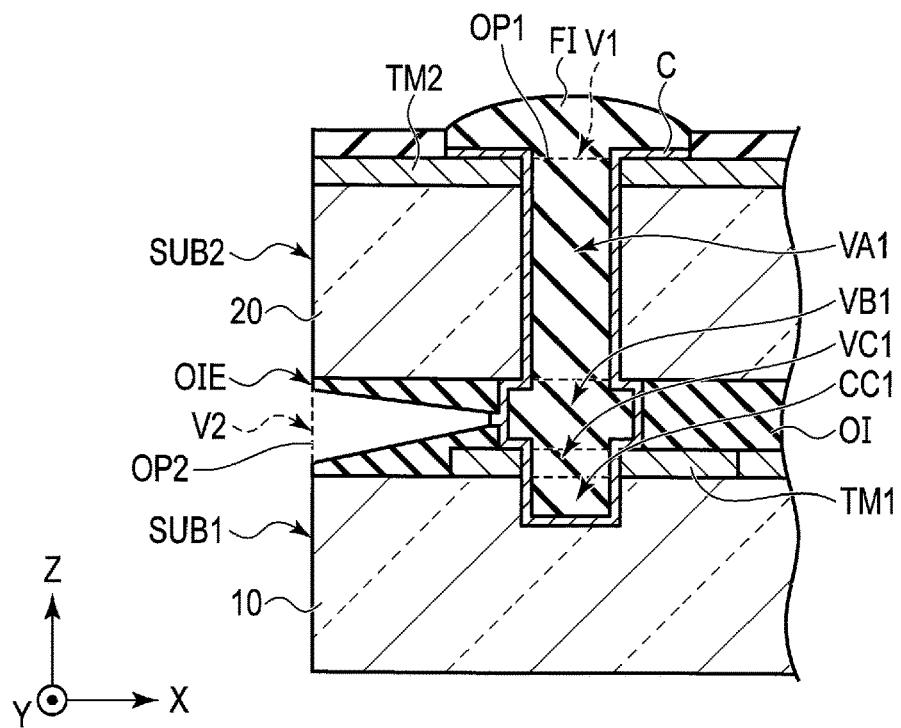
F I G. 5

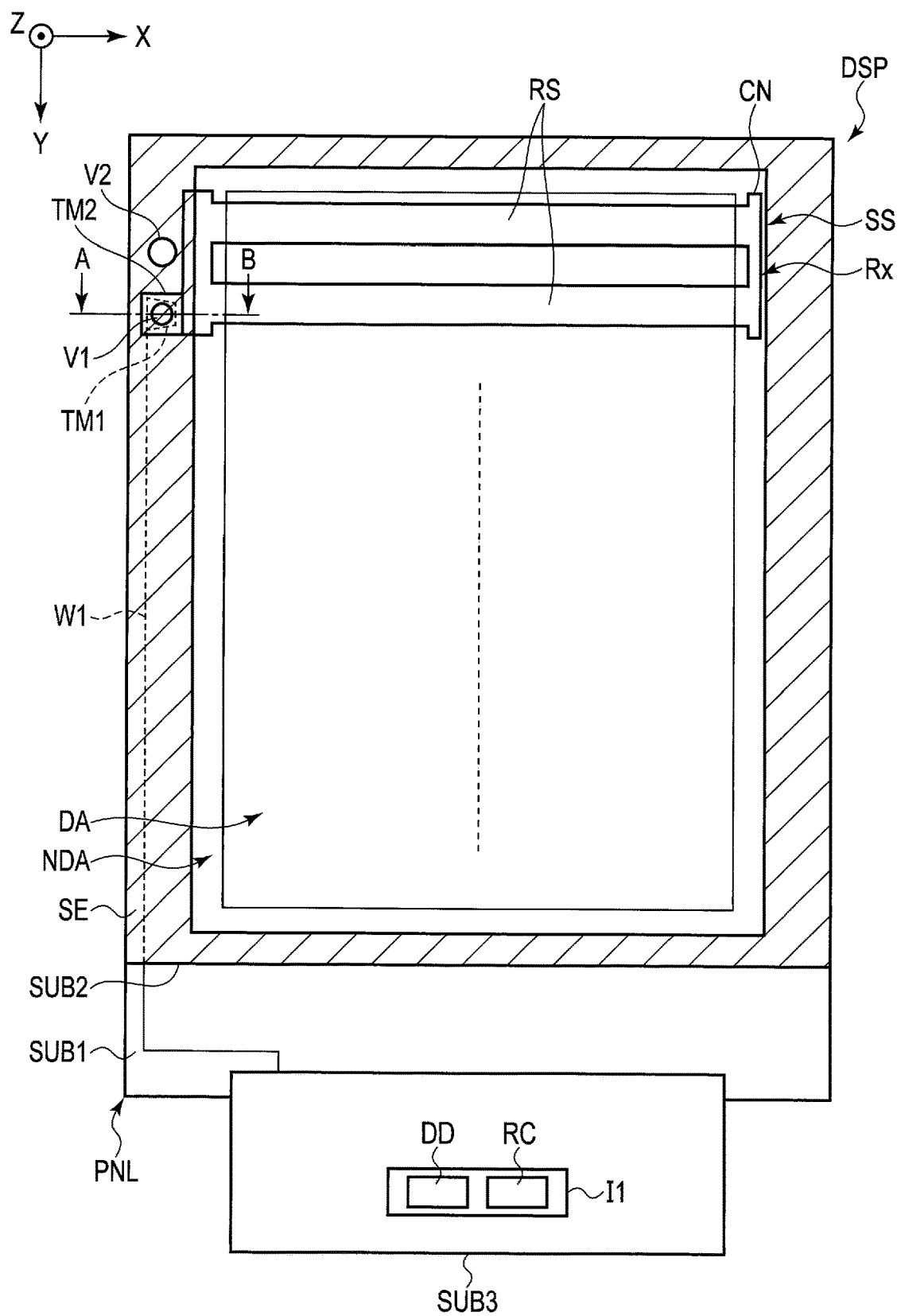
F I G. 6

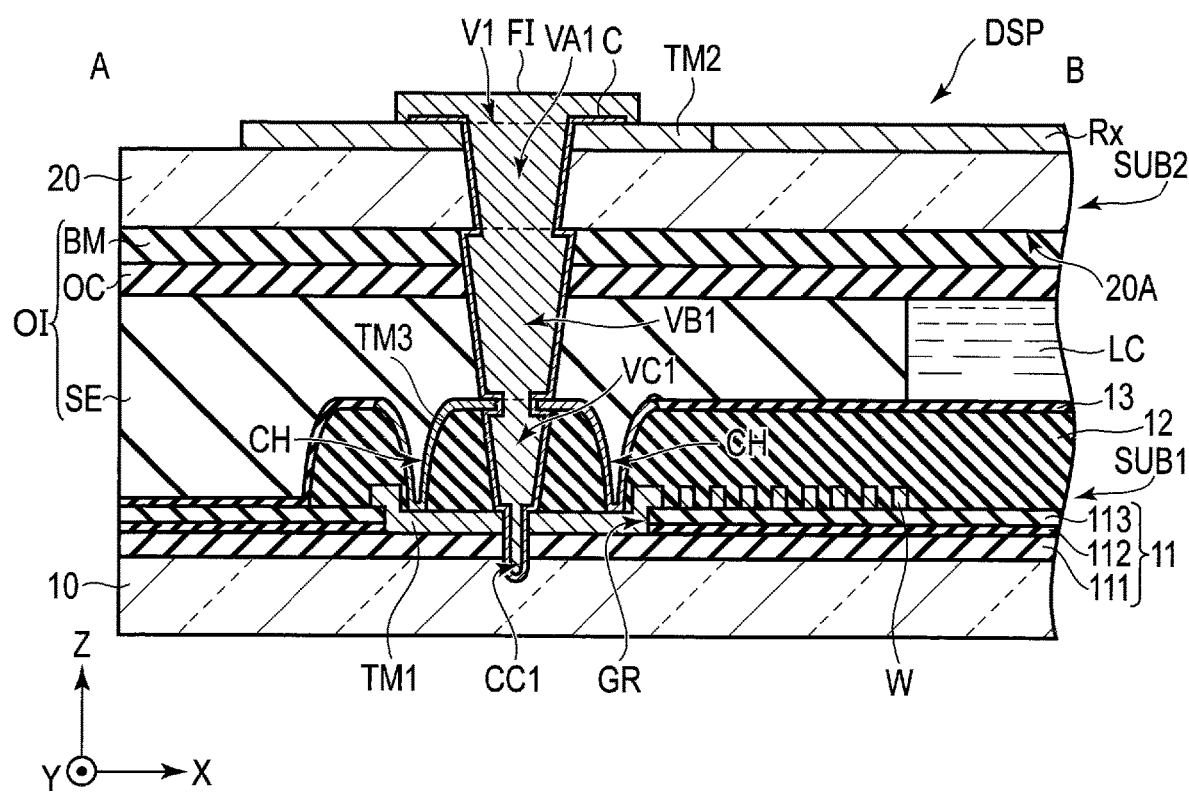
F I G. 10

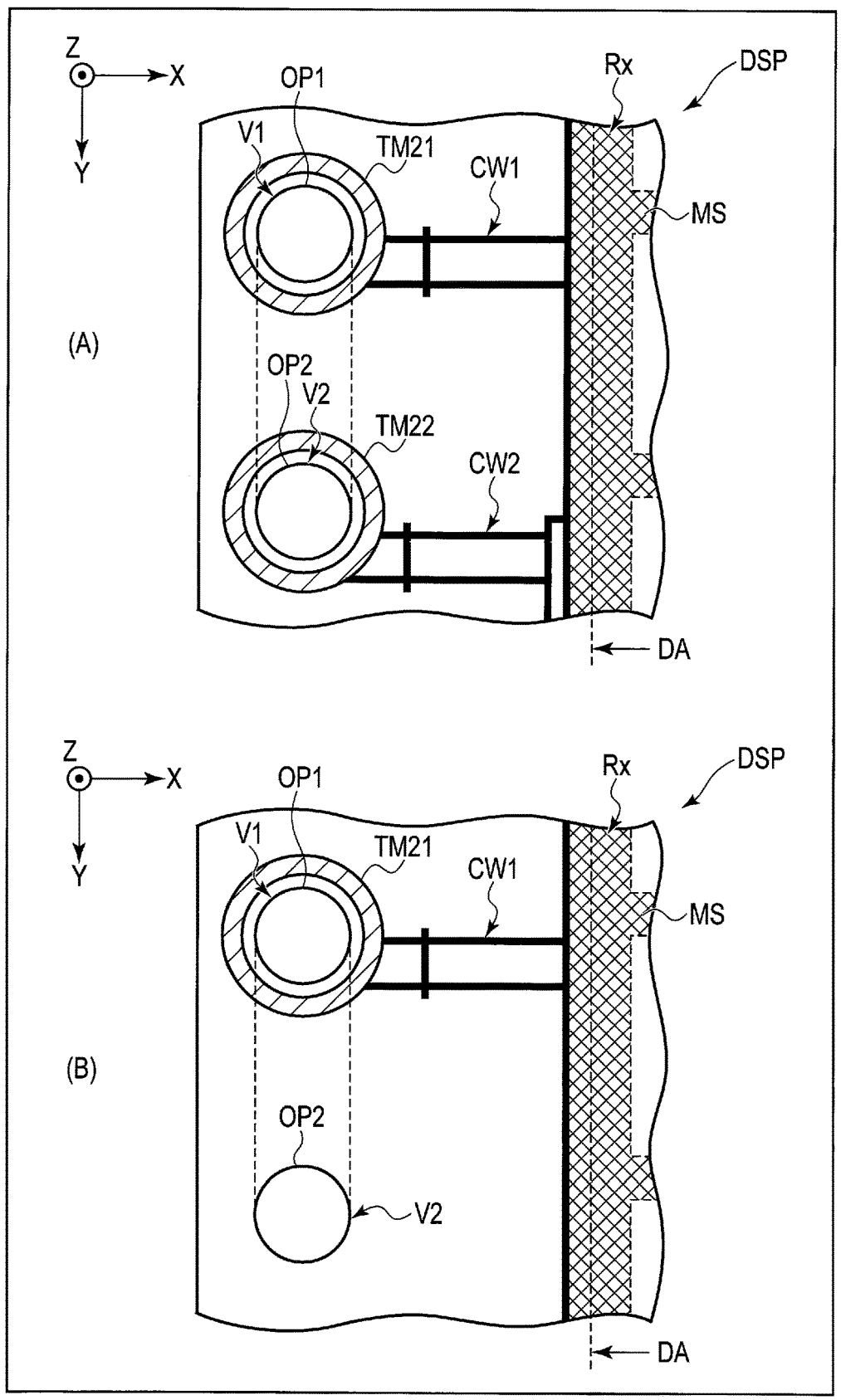
F I G. 11

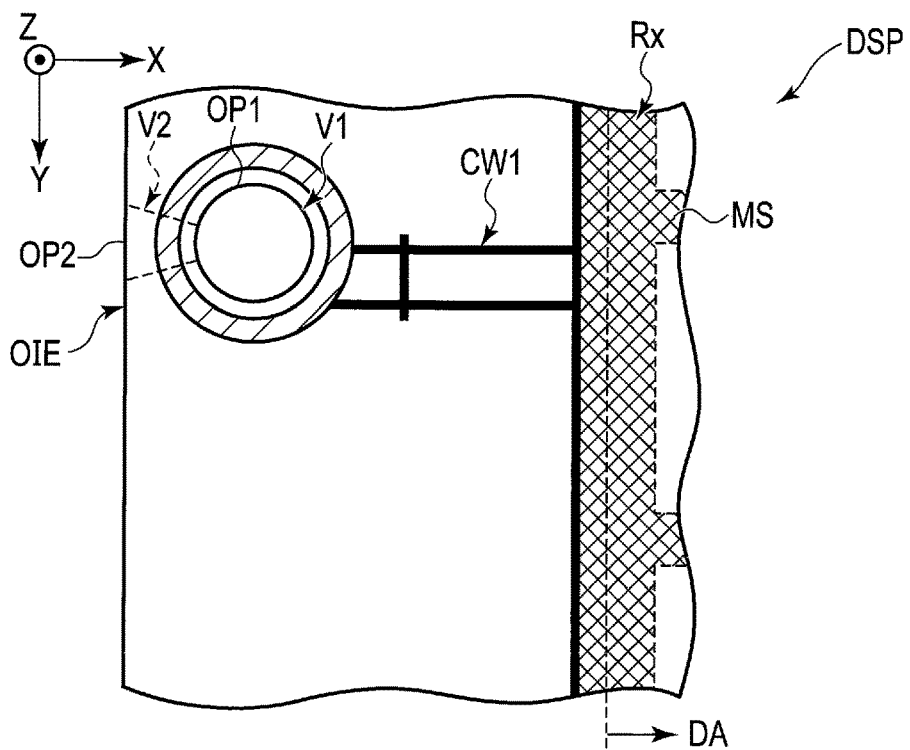
F I G. 12
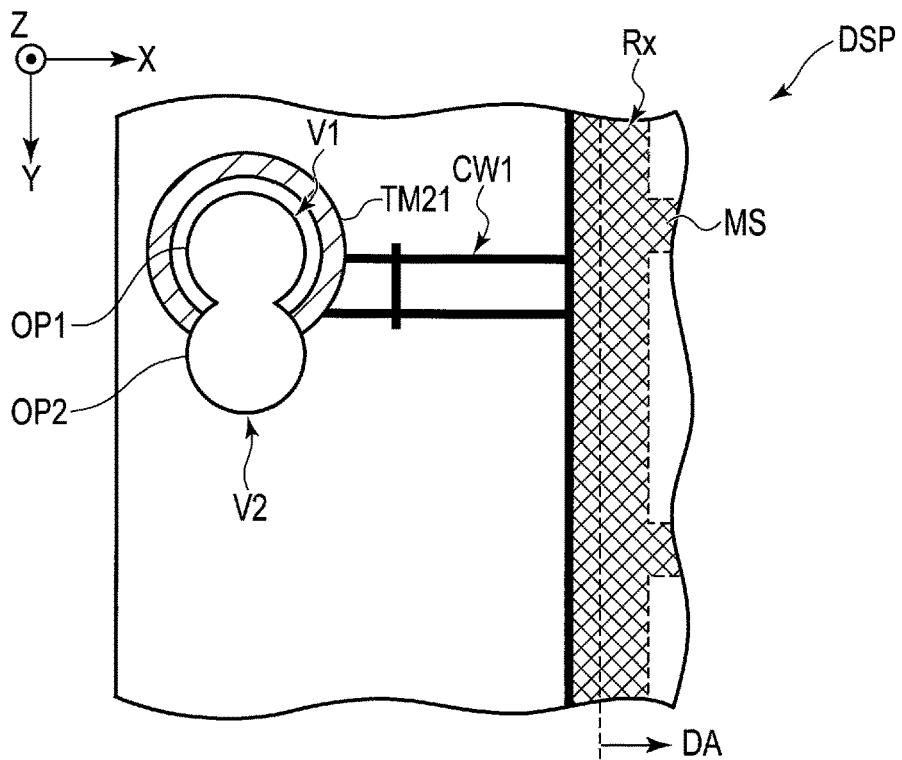
F I G. 13

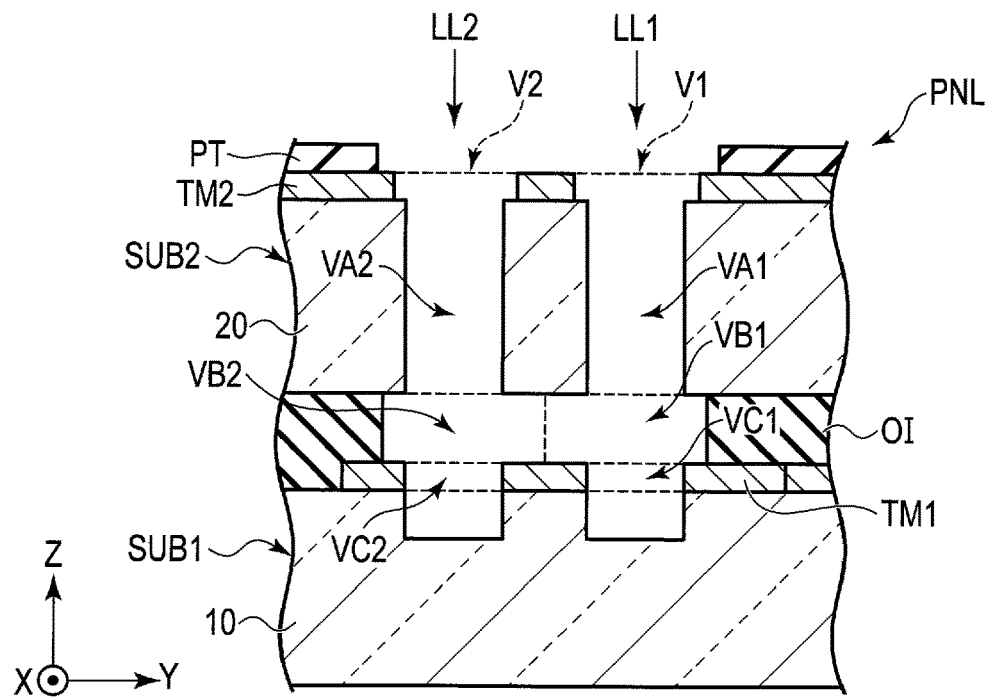
F I G. 14
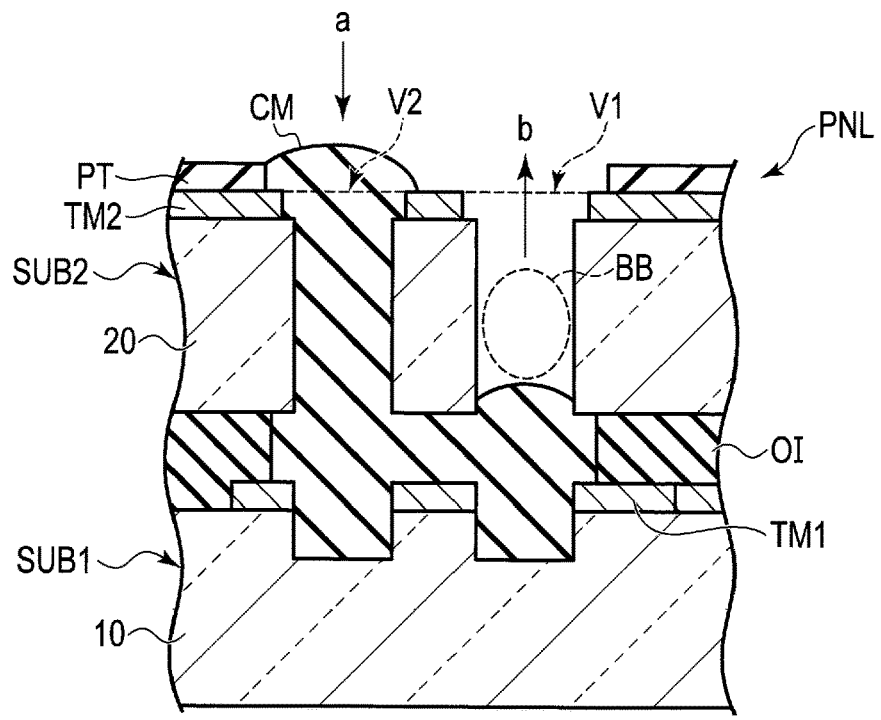
F I G. 15

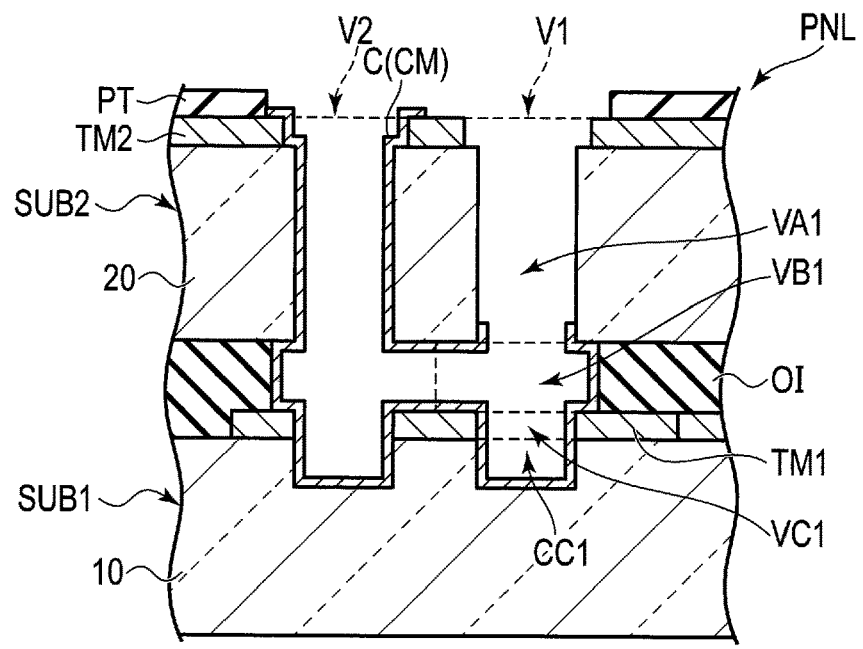
F I G. 16
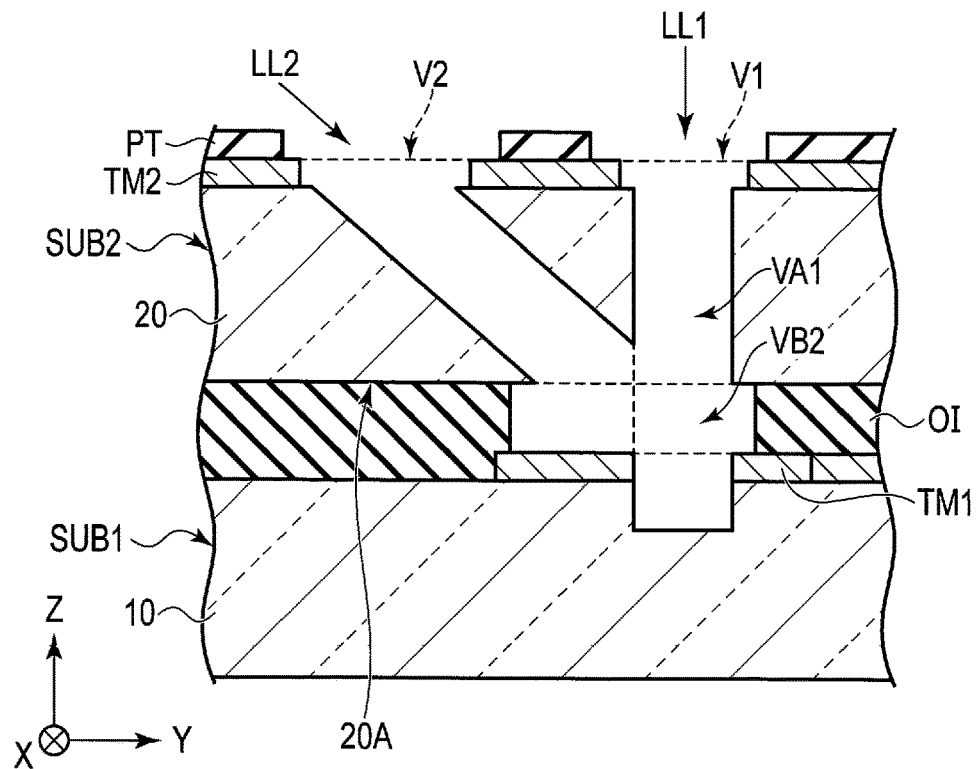
F I G. 17

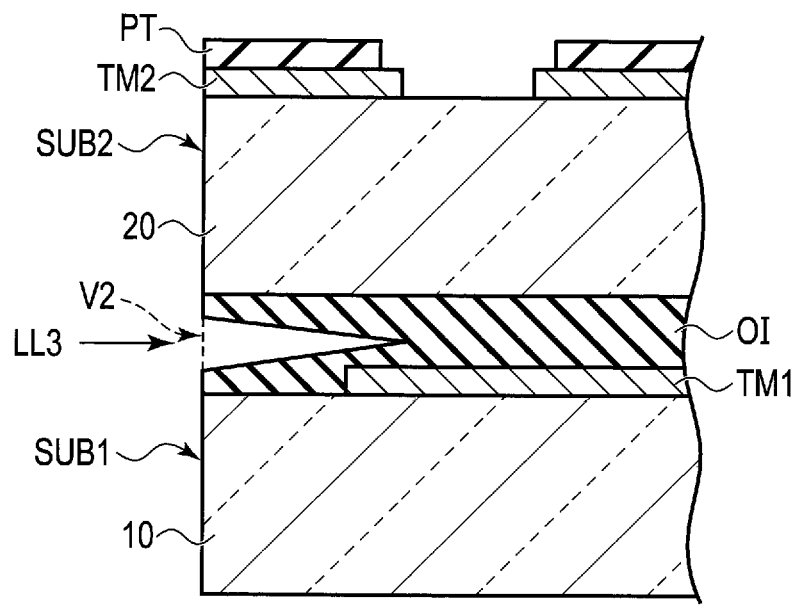
F I G. 20
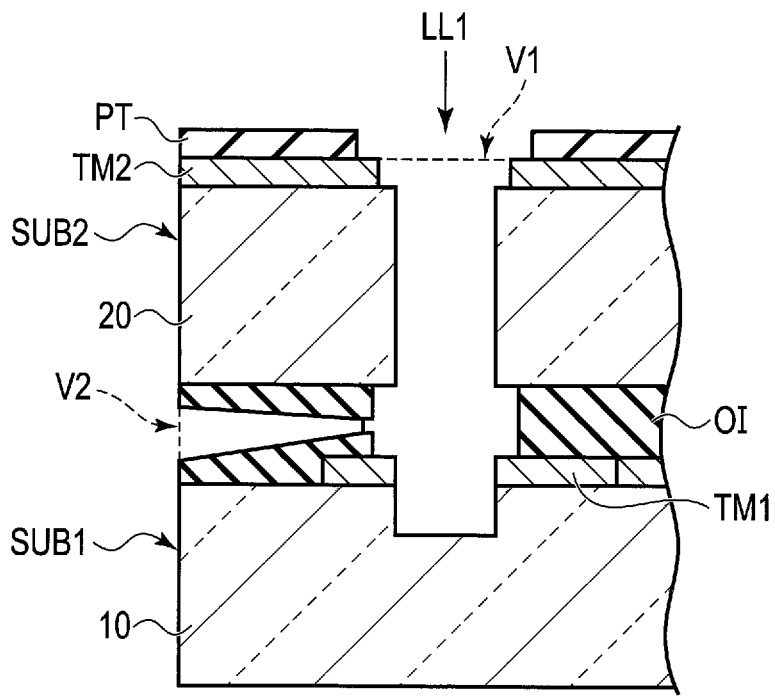
F I G. 21

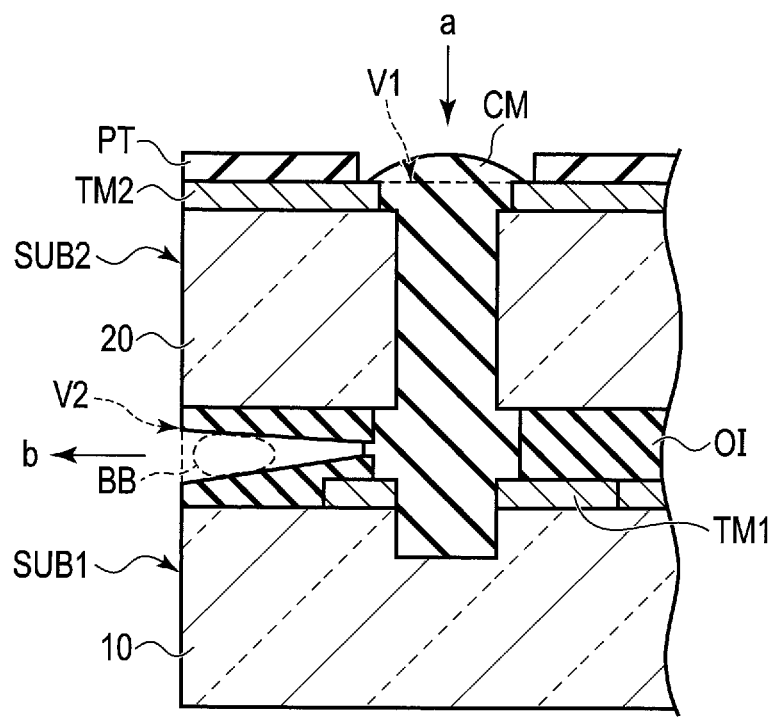
F I G. 22
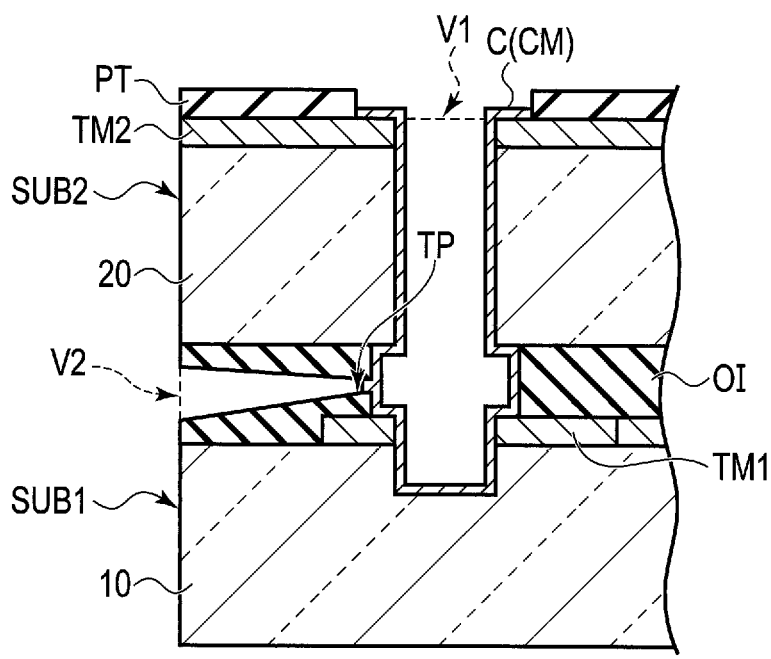
F I G. 23

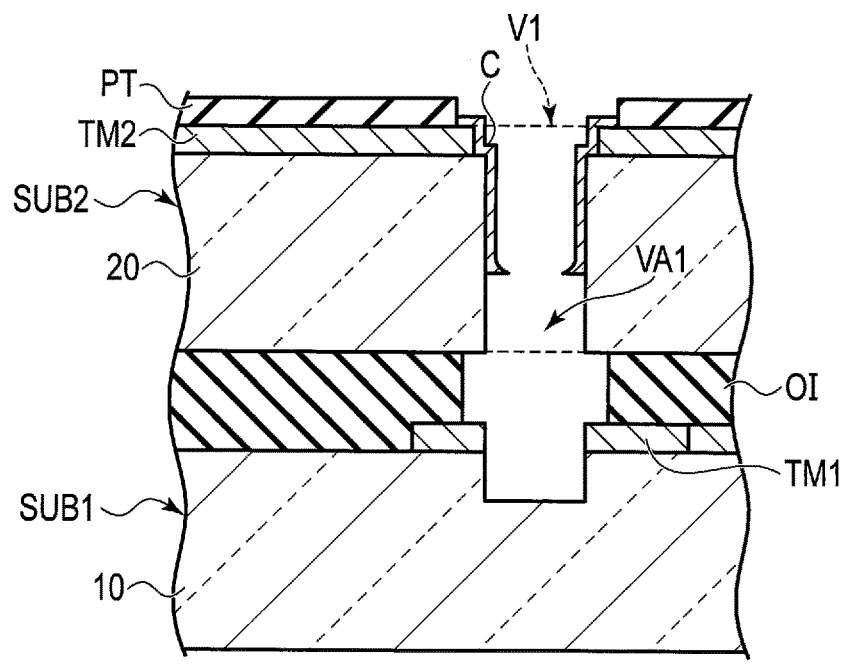
F I G. 24
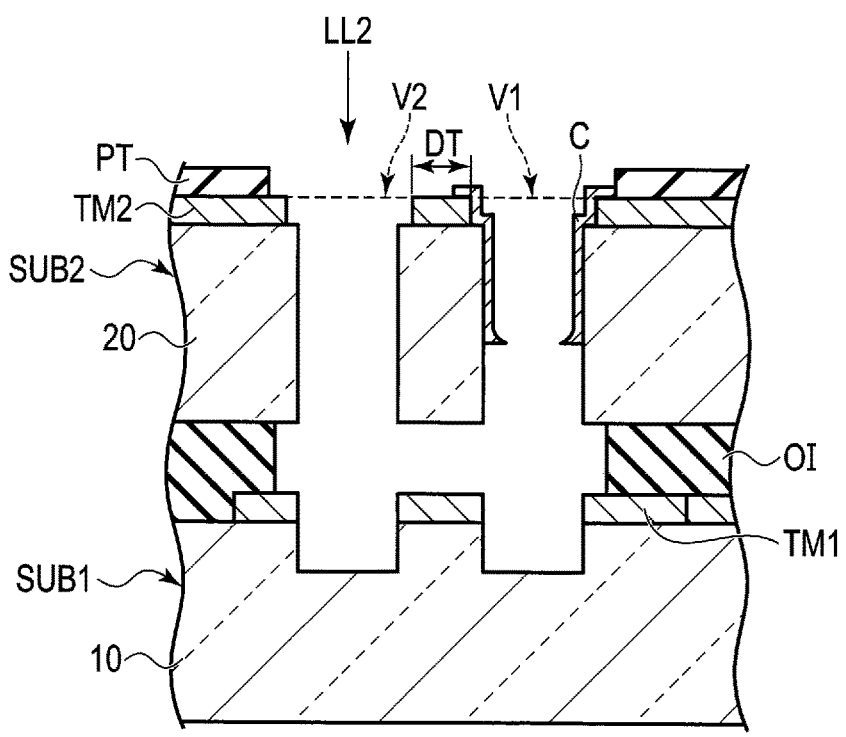
F I G. 25

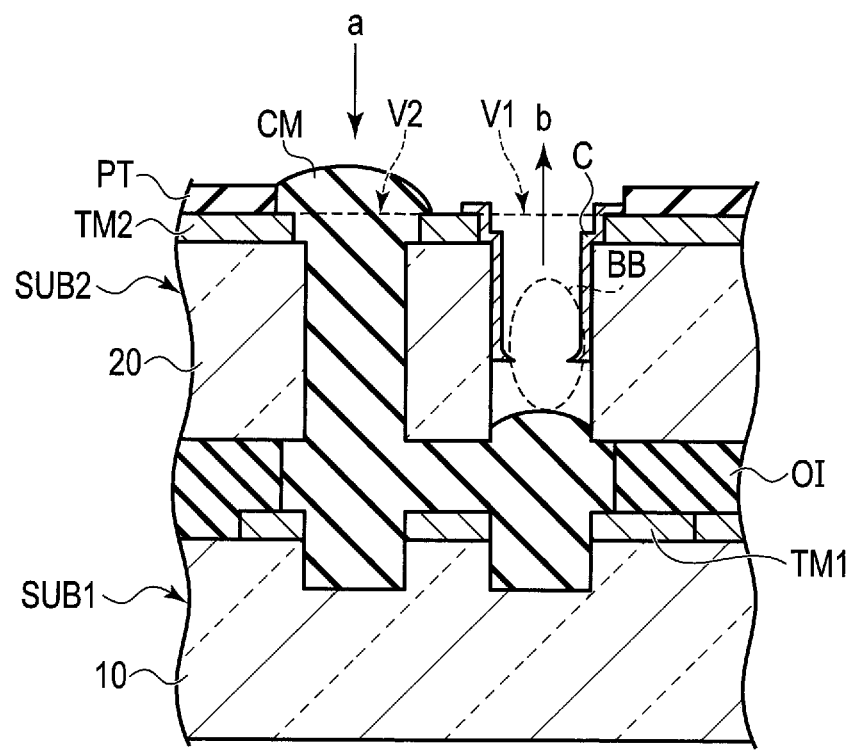
F I G. 26
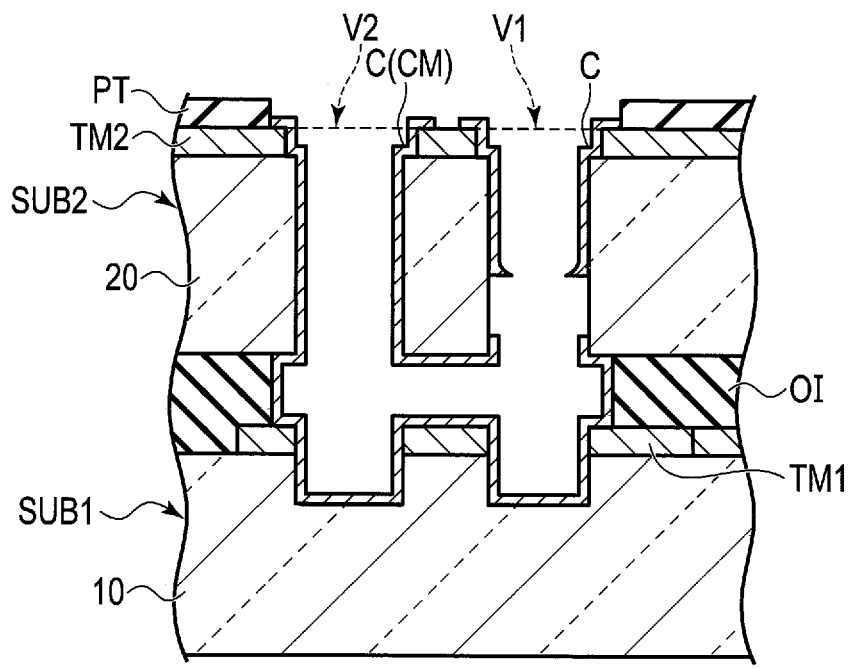
F I G. 27

DISPLAY DEVICE AND INTER-SUBSTRATE CONDUCTING STRUCTURE

CROSS-REFERENCE TO RELATED APPLICATIONS

This application is based upon and claims the benefit of priority from Japanese Patent Application No. 2017-012120, filed Jan. 26, 2017, the entire contents of which are incorporated herein by reference.

FIELD

Embodiments described herein relate generally to a display device and an inter-substrate conducting structure.

BACKGROUND

In recent years, various techniques for reducing the width of the frame in display devices are being studied. One example discloses a technique of utilizing another connector (inter-substrate connector) which electrically connects a wiring portion comprising a contact-hole connecting material inside a hole which penetrates an inner surface and an outer surface of a resin-made first substrate, and a wiring portion provided on an inner surface of a resin-made second substrate to each other.

SUMMARY

The present application generally relates to a display device and an inter-substrate conducting structure.

According to one embodiment, a display device includes a first substrate including a first basement and a first terminal, a second substrate opposing the first substrate and including a second basement and a second terminal, an organic insulating layer located between the first basement and the second basement, a first hole penetrating the second basement and the organic insulating layer, a second hole penetrating at least one of the second basement and the organic insulating layer and communicating to the first hole and a connecting material provided at least one of the first hole and the second hole to electrically connect the first terminal and the second terminal to each other.

BRIEF DESCRIPTION OF THE DRAWINGS

FIG. 2 is a cross-sectional view showing an example of the display device shown in FIG. 1.

FIG. 3 is a cross-sectional view showing an example of the display device shown in FIG. 1.

FIG. 4 is a cross-sectional view showing an example of the display device shown in FIG. 1.

FIG. 5 is a cross-sectional view showing an example of the display device shown in FIG. 1.

FIG. 6 is a plan view showing a configuration example of the display device of the embodiment.

FIG. 10 is a cross section of the display panel taken along a line A-B shown in FIG. 6 including a first hole.

FIG. 11 is a plan view showing an example of the structure of a detection electrode and a second terminal shown in FIG. 6.

FIG. 12 is a plan view showing another example of the structure of the detection electrode and the second terminal shown in FIG. 6.

FIG. 13 is a plan view showing another example of the structure of the detection electrode and the second terminal shown in FIG. 6.

FIG. 14 is a diagram showing a step of a method of manufacturing the display device shown in FIG. 3.

FIG. 15 is a diagram showing a next step of the method of manufacturing the display device shown in FIG. 3.

FIG. 16 is a diagram showing a next step of the method of manufacturing the display device shown in FIG. 3.

FIG. 17 is a diagram showing a step of a method of manufacturing the display device shown in FIG. 1.

FIG. 20 is a diagram showing a step of a method of manufacturing the display device shown in FIG. 1.

FIG. 21 is a diagram showing a next step of the method of manufacturing the display device shown in FIG. 5.

FIG. 22 is a diagram showing a next step of the method of manufacturing the display device shown in FIG. 5.

FIG. 23 is a diagram showing a next step of the method of manufacturing the display device shown in FIG. 5.

FIG. 24 is a diagram showing a step in a modification of the method of manufacturing the display device shown in FIG. 3.

FIG. 25 is a diagram showing a next step in the modification of the method of manufacturing the display device shown in FIG. 3.

FIG. 26 is a diagram showing a next step in the modification of the method of manufacturing the display device shown in FIG. 3.

FIG. 27 is a diagram showing a next step in the modification of the method of manufacturing the display device shown in FIG. 3.

DETAILED DESCRIPTION

Figure 1:
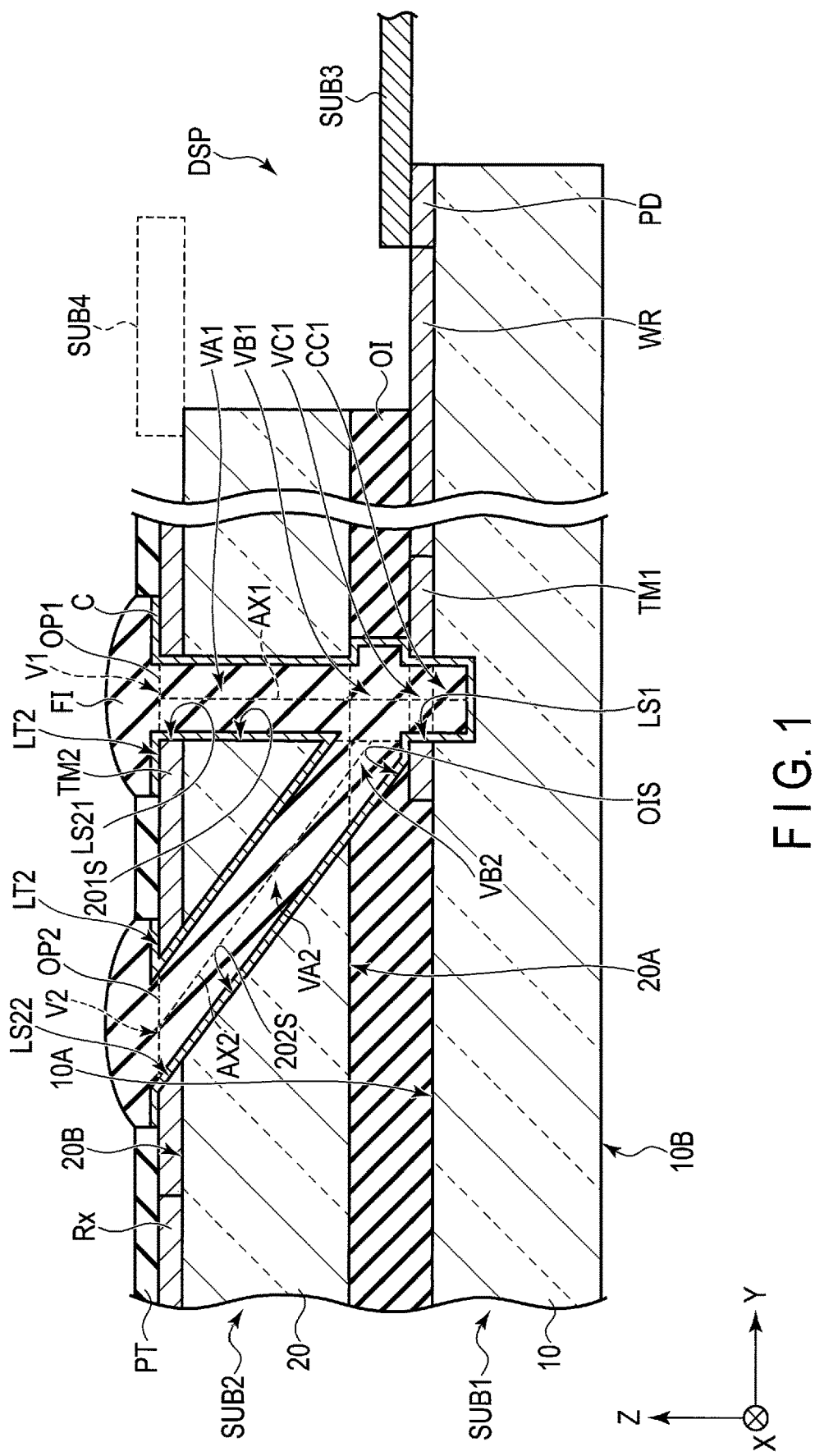
FIG. 1 is a cross-sectional view showing a configuration example of a display device of an embodiment.

In general, according to one embodiment, a display device is provided, which comprises a first substrate comprising a first basement and a first terminal, a second substrate opposing the first substrate and comprising a second basement and a second terminal, an organic insulating layer located between the first basement and the second basement, a first hole penetrating the second basement and the organic insulating layer, a second hole penetrating at least one of the second basement and the organic insulating layer and communicating to the first hole and a connecting material provided at least one of the first hole and the second hole to electrically connect the first terminal and the second terminal to each other.

According to another embodiment, an inter-substrate conducting structure is provided, which comprises a first substrate comprising a first basement and a first terminal, a second substrate opposing the first substrate and comprising a second basement and a second terminal, an organic insulating layer located between the first basement and the second basement, a first hole penetrating the second basement and the organic insulating layer, a second hole penetrating at least one of the second basement and the organic insulating layer and communicating to the first hole and a connecting material provided at least one of the first hole and the second hole to electrically connect the first terminal and the second terminal to each other.

Embodiments will now be described with reference to accompanying drawings. Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

In the embodiment, a display device will be disclosed as an example of the electronic device. The display device can be used in, for example, various types of equipment such as smartphones, tablet terminals, mobile telephone terminals, notebook personal computers, and game consoles. The major configuration explained in the present embodiment can also be applied to a liquid crystal device, a self-luminous display device comprising an organic electroluminescent display element, and the like, an electronic paper display device comprising an electrophoretic element, and the like, a display device employing micro-electromechanical systems (MEMS), or a display device employing electrochromism.

FIG. 1 is a cross sectional view showing a configuration example of a display device DSP of this embodiment. Here, a first direction X, a second direction Y, and a third direction Z are orthogonal to each other, but they may cross at an angle other than 90 degrees. The first direction X and the second direction Y are parallel to a surface of a substrate of the display device DSP, and the third direction Z is a thickness direction of the display device DSP. Here, FIG. 1 shows a cross sectional view of a part of the display device DSP in an X-Y plane defined by the first direction X, and the second direction Y.

The display device DSP comprises a first substrate SUB1, a second substrate SUB2, an organic insulating layer OI, a connecting material C, and a filling material FI. The first substrate SUB1 and the second substrate SUB2 oppose each other in the third direction Z. In the following descriptions, the direction from the first substrate SUB1 towards the second substrate SUB2 is defined as above (or simply up), and the direction from the second substrate SUB2 towards the first substrate SUB1 is defined as below (or simply down). Viewing from the second substrate SUB2 towards the first substrate SUB1 is defined as planar view.

The first substrate SUB1 comprises a first basement 10, a first terminal TM1, wirings WR, and a pad electrode PD. The first basement 10 comprises a surface 10A opposing the second substrate SUB2 and another surface 10B on an opposite side to the surface 10A. In the example illustrated, the first terminal TM1, wiring WR, and pad electrode PD are located on a surface 10A side. The wiring WR is disposed between the first terminal TM1 and the pad electrode PD. The first terminal TM1 and the pad electrode PD are electrically connected to each other via the wiring WR. Although not illustrated in the figure, various types of insulating layers and conducting layers may be disposed between the first basement 10 and a group of the first terminal TM1, wiring WR and pad electrode PD, and on the first terminal TM1, the wiring WR and the pad electrode PD. Further, the first terminal TM1, the wiring WR, and the pad electrode PD may be formed in layers separate from each other via an insulating layer or the like. Note that the first basement 10 corresponds to a first insulating substrate, and the second basement 20 corresponds to a second insulating substrate. As the first insulating substrate and second insulating substrate, resin substrates can be adopted.

The second substrate SUB2 comprises a second basement 20, a second terminal TM2, a detection electrode Rx and a protection material PT. The second basement 20 comprises a surface (lower surface) 20A opposing the first substrate SUB1 and another surface (upper surface) 20B on an opposite side to the surface 20A. The surface 20A opposes the first terminal TM1 and is spaced apart from the first terminal TM1 along the third direction Z. The first basement 10 and the second basement 20 are formed from, for example, no-alkali glass. In the example illustrated, the second terminal TM2 and the detection electrode Rx are located on a surface 20B side. The second terminal TM2 and the detection electrode Rx are electrically connected to each other. The protection material PT is disposed on the detection electrode Rx and the second terminal TM2. Although not illustrated, various types of insulating layers and conducting layers may be provided between a group of the second terminal TM2 and detection electrode Rx and the second basement 20.

The organic insulating layer OI is located between the first basement 10 and the second basement 20. Further, the organic insulating layer OI is located also on the first terminal TM1 and the wiring WR. Here, the organic insulating layer OI includes, for example, a light-shielding layer, a color filter, an overcoat layer, and an alignment film, which will be described later, and also a sealing material which adheres the first substrate SUB1 and the second substrate SUB2 to each other.

A wiring substrate SUB3 is mounted on the first substrate SUB1 so as to be electrically connected to the pad electrode PD. The wiring substrate SUB3 having such configuration is, for example, a flexible substrate with flexibility. Note that a flexible substrate applicable to this embodiment should only comprise at least partially a flexible portion of a bendable material. For example, the wiring substrate SUB3 of this embodiment each may be a flexible substrate in its entirety, or may be a rigid flexible substrate comprising a rigid portion formed of a rigid material such as glass epoxy and a flexible portion formed of a bendable material such as polyimide.

Here, a connection structure between the first terminal TM1 and the second terminal TM2 in this embodiment will be described in detail. The display device DSP comprises a first hole V1 and a second hole V2. The first hole V1 includes a hole portion (first hole portion) VA1 formed in the second substrate SUB2, which penetrates the second basement 20. The hole portion VA1 penetrates from the surface 20B to the surface 20A. In the example illustrated, the hole portion VA1 penetrates the second terminal TM2 as well.

The first hole V1 also includes a hole portion (second hole portion) VB1 which penetrates the organic insulating layer OI. The hole portion VB1 is communicated to the hole portion VA1.

The first hole V1 comprises a hole portion VC1 in the first substrate SUB1, which penetrates the first terminal TM1. The hole portion VC1 is communicated with the hole portion VB1. Further, the first hole V1 includes a concavity CC 1 formed in the first basement 10. The concavity CC 1 opposes the hole portion VC1 along the third direction Z. The concavity CC 1 is formed from the surface 10A toward the surface 10B, but in the example illustrated, it does not penetrate to the surface 10B. For example, the depth of the concavity CC along the third direction Z is about ⅕ to ½ of the thickness of the first basement 10 along the third direction Z. Note that the first basement 10 may comprise a hole which penetrates from the surface 10A to the surfaces 10B in place of the concavity CC. The hole portions VB1 and VC1 and the concavity CC are each located directly under the hole portion VA1. The hole portions VA1, VB1 and VC1 and the concavity CC are arranged on the same straight line along the third direction Z.

In the example illustrated, the hole portion VB1 is expanded in the second direction Y as compared to the hole portions VA1 and VC1. The hole portion VB1 is expanded not only in the second direction Y but also in all directions in the X-Y plane further than the hole portions VA1 and VC1.

The second hole V2 comprises a hole portion (third hole portion) VA2 in the second substrate SUB2, which penetrates the second basement 20. The hole portion VA2 penetrates from the surface 20B to the surface 20A. In the example illustrated, the hole portion VA2 penetrates the second terminal TM2 as well.

The second hole V2 also comprises a hole portion (fourth hole portion) VB2 which penetrates the organic insulating layer OI between the first substrate SUB1 and the second substrate SUB2. The hole portion VB2 is communicated with the hole portion VA2. Further, the hole portion VB2 is communicated with the hole portion VB1 along the second direction Y, to form one hole portion together with the hole portion VB1.

In the first hole V1, for example, the hole portion VA1 is formed into approximately a cylindrical shape, but the hole portion VA1 may be formed to be tapered off from the top toward the bottom. Further, in the second hole V2, for example, the hole portion VA2 is formed into approximately a cylindrical shape, but the hole portion VB1 may be formed to be tapers off from the top toward the bottom.

Here, the first hole V1 has a central axis AX1 along the extending direction of the first hole V1. The second hole V2 has a central axis AX2 along the extending direction of the second hole V2. In the example illustrated, the central axis AX2 is inclined with respect to the central axis AX1. More specifically, the central axis AX1 is parallel to the third direction Z, and the central axis AX2 is inclined with respect to the third direction Z. The second hole V2 is communicated with the first hole V1. In the example illustrated, the second hole V2 is communicated with the hole portions VA1 and VB1.

As described above, the first hole V1 and the second hole V2 each penetrate the second basement 20 and the organic insulating layer OI. Note here it suffices if the second hole V2 penetrates at least one of the second basement 20 and the organic insulating layer OI to be communicated with the first hole V1. More specifically, as will be described later, the second hole V2 may penetrate the second basement 20 between the surface 20B and the hole portion VA1 or may penetrate the organic insulating layer OI between an outer end of the organic insulating layer OI and the hole portion VB1. Further, the second hole V2 may be formed parallel to the first hole V1.

The first hole V1 has an opening OP1 opened upward from the second substrate SUB2. The second hole V2 has an opening OP2 opened upwards from the second substrate SUB2. In the example illustrated, the openings OP1 and OP2 are located in an upper surface LT of the second terminal TM22 and spaced apart from each other. In other words, the second basement 20 is interposed between the hole portion VA1 and the hole portion VA2.

The connecting material C is provided through the first hole V1 and the second hole V2 to electrically connected the first terminal TM1 and the second terminal TM2 to each other. The connecting material C should preferably contain a metal material such as silver and fine particles having a diameter of the order of from several nanometers to tens of nanometers, with which the metal material is mixed. In the first hole V1, the connecting material C is provided on an inner surface of each of the hole portions VA1, VB1, VC1 and the concavity CC 1, and in the second hole V2, it is provided on an inner surface of each of the hole portions VA2 and VB2. In the example illustrated, the connecting material C is in contact with the upper surface LT2, inner surfaces LS21 and LS22 of the second terminal TM2, and inner surfaces 201S and 202S of the second basement 20. The inner surfaces LS21 and 201S form the inner surface of the hole portion VA1. The inner surfaces LS22 and 202S form the inner surface of the hole portion VA2.

The connecting material C is in contact with an inner surface OIS of the organic insulating layer OI. The inner surface OIS forms an inner surface of a hole portion formed by communicating the hole portions VB1 and VB2 to each other. Further, the connecting material C is also in contact with each of the inner surface LS1 of the first terminal TM1 and the concavity CC1 in the first substrate SUB1. The inner surface LS1 forms the inner surface of the hole portion VC1.

In the example illustrated, the connecting material C is formed without interruption through the first hole V1 and the second hole V2. Note that the connecting material C should only electrically connect the first terminal TM1 and the second terminal TM2 to each other via at least one of the first hole V1 and the second hole V2.

In the example illustrated, the connecting material C is formed on the inner surfaces of the first hole V1 and the second hole V2, but it may be provided to fill at least one of the first hole V1 and the second hole V2 to be buried. In this case as well, the connecting material C is formed continuously without interruption between the first terminal TM1 and the second terminal TM2.

Note that since the solvent for the connecting material C in this embodiment evaporates in the manufacturing process, the connecting material C, which attaches to the wall surfaces of the first hole V1 and the second hole V2, may be formed in the form of a thin film of a metal material.

Hollow portions of the first hole V1 and the second hole V2 are filled with the filling material FI. Further, the filling material FI is disposed above the second terminal TM2 as well to cover the connecting material C. The filling material FI has, for example, insulating properties, and is formed from an organic insulating material. Thus, with the filling material FI, a level difference along the third direction Z resulting from the hollow portions formed in the first hole V1 and the second hole V2 can be reduced. Further, the connecting material C can be protected. Moreover, the filling material FI may have conductivity and, for example, may be a material obtained by hardening a paste containing conductive particles such as of silver. In the case where the filling material FI has conductivity, even if the connecting material C is come down in the in the first hole V1 and the second hole V2, the filling material FI can electrically connect the first terminal TM1 and the second terminal TM2 to each other, thereby making it possible to improve the reliability.

With the above-described structure, the second terminal TM2 is electrically connected to the wiring substrate SUB3 via the connecting material C, the first terminal TM1 and the like. Thus, control circuits for writing signals to the detection electrode Rx or reading signals output therefrom are connected to the detection electrode Rx via the wiring substrate SUB3. In other words, in order to connect the detection electrode Rx and the control circuits to each other, it is not necessary to provide a wiring substrate SUB4, indicated by dotted line in FIG. 1, in the second substrate SUB2.

FIG. 2 is a cross sectional view showing an example of the display device DSP shown in FIG. 1. Here, only the main part necessary for explanation is illustrated. The structure shown in FIG. 2 is different from that of FIG. 1 in that the second hole V2 does not penetrate the organic insulating layer OI.

That is, the second hole V2 penetrates the second basement 20 between the surface 20B and the hole portion VA1. Here, the openings OP1 and OP2 are spaced from each other. Note, as shown in FIG. 2, a protection material PT may not necessarily be provided above the second terminal TM2 between the opening OP1 and the opening OP2, but the filling material FI may be provided there.

FIG. 3 is a cross sectional view showing an example of the display device DSP shown in FIG. 1. The structure shown in FIG. 2 is different from that of FIG. 1 in that the second hole V2 is parallel to the first hole V1.

The second hole V2 comprises, in the first substrate SUB1, a hole portion VC2 which penetrates the first terminal TM1 and a concavity CC2 formed in the first basement 10 in addition to the hole portions VA2 and VB2. The hole portion VC2 is communicated with the hole portion VB2. The concavity CC2 opposes the hole portion VC2 along the third direction Z. In the example illustrated, the hole portions VA1 and VA2 are spaced from each other along the second direction Y. In other words, the second basement 20 and the second terminal TM2 are interposed between the hole portion VA1 and the hole portion VA2. Here, the openings OP1 and OP2 are spaced from each other. The hole portion VB2 is expanded in the second direction Y as compared to the hole portions VA2 and VC2. The hole portion VB2 is expanded not only in the second direction Y but in all directions in the X-Y plane as compared to the hole portions VA2 and VC2. Thus, the hole portions VB1 and VB2 are communicated with each other along the second direction Y. Further, the hole portions VC1 and VC2 are spaced from each other along the second direction Y. In other words, the first terminal TM1 is interposed between the hole portion VC1 and the hole portion VC2. Moreover, the concavities CC1 and CC2 are spaced from each other along the second direction Y. In other words, the first basement 10 is interposed between the concavity CC1 and the concavity CC2.

FIG. 4 is a cross sectional view showing an example of the display device DSP shown in FIG. 1. The structure shown in FIG. 4 is different from that of FIG. 3 in that the second hole V2 and the first hole V1 are communicated to each other along the second direction Y.

Here, the openings OP1 and OP2 are communicated to each other. The hole portions VB1 and VB2 are communicated to each other along the second direction Y. The hole portions VC1 and VC2 are communicated to each other along the second direction Y. The concavities CC1 and CC2 are communicated to each other along the second direction Y. That is, the second hole V2 is communicated to the first hole V1 along the second direction Y continuously from the hole portion VA2 to the concavity CC2.

FIG. 5 is a cross sectional view showing an example of the display device DSP shown in FIG. 1. The cross section shown here is taken along the X-Z plane defined by the first direction X and the third direction Z. The structure shown in FIG. 5 is different from that of FIG. 1 in the position of the second hole V2.

In the example illustrated, the second hole V2 does not penetrate the second basement 20, but penetrates the organic insulating layer OI. The second hole V2 penetrates the organic insulating layer OI between an outer end portion OIE of the organic insulating layer OI and the first hole V1. In the example illustrated, the second hole V2 penetrates from the outer end portion OIE to the hole portion VB1. Here, the opening OP2 is located in the outer end portion OIE. Moreover, the connecting material C is not disposed on the inner surface of the second hole V2.

FIG. 6 is a plan view showing a configuration example of the display device DSP of this embodiment. Here, a plane of the display device DSP taken along the X-Y plane defined by the first direction X and the second direction Y is shown.

The display device DSP comprises a display panel PNL, an IC chip I1, a wiring substrate SUB3 and the like. The display panel PNL is a liquid crystal display panel, and comprises a first substrate SUB1, a second substrate SUB2, a sealing material SE and a display function layer equivalent to a liquid crystal layer. The second substrate SUB2 opposes the first substrate SUB1. The sealing material SE corresponds to a portion hatched by lines upwardly slanting to the right in FIG. 6 and attaches the first substrate SUB1 and the second substrate SUB2 together.

The display panel PNL comprises a display area DA which displays images and a frame-shaped non-display area NDA surrounding the display area DA. The sealing material SE is located in the non-display area NDA and the display area DA is located in an inner side encircled by the sealing material SE.

The wiring substrate SUB3 is mounted on the first substrate SUB1. The IC chip I1 is mounted on the wiring substrate SUB3. Note that this configuration is not limited to the example illustrated, but the IC chip I1 may be mounted on the portion of the first substrate SUB1, which extends out from the second substrate SUB2, or on an external circuit board connected to the wiring substrate SUB3. The IC chip I1 includes, for example, a built-in display driver DD which outputs a signal required to display images. The display driver DD described here contains at least a part of signal line drive circuits SD, scanning line drive circuits GD and common electrode drive circuits CD, which will be described later. In the example illustrated, the IC chip I1 contains a built-in detector RC which functions as a touch-panel controller or the like. The detector RC may be built in the IC chip I1 or an IC chip other than the IC chip I1.

The display panel PNL may be, for example, any one of a transmissive type which displays images by selectively transmitting light from below the first substrate SUB1, a reflective type which displays images by selectively reflecting light from above the second substrate SUB2 and a trans-reflective type comprising a transmissive display function and a reflective display function.

A sensor SS carries out sensing to detect contact or approaching of an object with respect to the display device DSP. The sensor SS comprises a plurality of detection electrodes Rx (only one of which is shown in the figure). The detection electrodes Rx are each formed on the second substrate SUB2. These detection electrodes Rx each extend in the first direction X and are arranged along the second direction Y with gaps therebetween. Here, in FIG. 6, the left-hand side region to the display area DA is defined as one end side, and the right-hand side region to the display area DA is defined as the other end side.

The detection electrodes Rx each comprise a detector RS, and a connector CN1. The detector RS is located in the display area DA and extends in the first direction X. In the detection electrode Rx, the detector RS is mainly used for sensing. In the example illustrated, the detector RS is formed into a stripe shape, but more specifically, it is formed from an aggregate of fine metal thin wires as will be illustrated with reference to FIG. 11. Further, one detection electrode Rx comprises two detectors RS, but may comprise three or more detectors RS, or may comprise only one detector RS. The terminal RT is located on the other end side of the non-display area NDA along the first direction X and connects a plurality of detectors RS to each other.

The detection electrode Rx is connected to the second terminal TM2. The second terminal TM2 is formed in a position overlapping the sealing material SE in plan view. The second terminal TM2 is located on one end side of the non-display area NDA along the first direction X and is connected to the detector RS.

On the other hand, the first substrate SUB1 comprises a first terminal TM1 and a wiring W1, electrically connected to the wiring substrate SUB3. The first terminal TM1 and the wiring W1 are located in the one end side of the non-display area NDA and overlap the sealing material SE in plan view. The first terminal TM1 is formed in a position which overlaps the second terminal TM2 in plan view. The wiring W1 is connected to the first terminal TM1, extending along the second direction Y, and is electrically connected to the detector RC of the IC chip I1 via the wiring substrate SUB3.

The first hole V1 is formed in a position where the second terminal TM2 and the first terminal TM1 oppose each other. The second hole V2 is aligned with the first hole V1 along the second direction Y. As described above, the connecting material C having conductivity is provided in at least one of the first hole V1 and the second hole V2. With this structure, the second terminal TM2 and the first terminal TM1 are electrically connected to each other. That is, the detection electrode Rx provided in the second substrate SUB2 is electrically connected with a detector circuit RC via the wiring substrate SUB3 connected to the first substrate SUB1. The detector RC reads a sensor signal output from the detection electrode Rx to detect whether an object contacts or approaches, and the position coordinate of the object detected, etc.

In the example illustrated, the first hole V1 and the second hole V2 are circular in planar view, but the shape thereof is not limited to that of the example illustrated, but may be some other shape such as elliptical.

The wiring W1 is connected to the detection electrode Rx via the first terminal TM1, and therefore when the wiring W1 connected to the detection electrode Rx is formed on a first substrate SUB1 side, the region for forming the wiring W1 in the second substrate SUB2 is no longer necessary. Consequently, the region for arranging other members can be expanded, and further the degree of freedom in the layout of the shape of the second substrate SUB2 can be improved.

Figure 7:
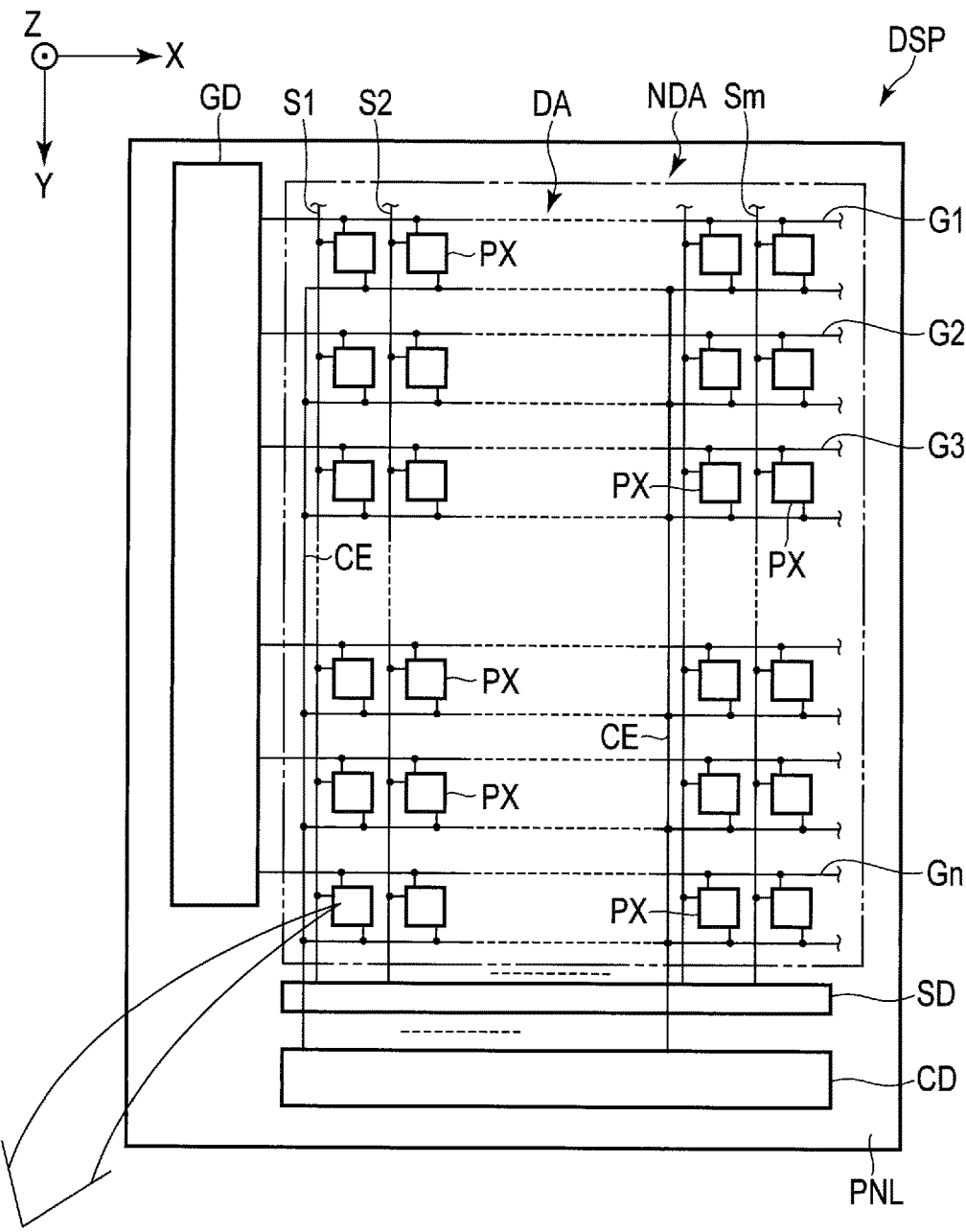
FIG. 7 is a diagram showing a basic structure and an equivalent circuit of a display panel shown in FIG. 6.
Figure 7:
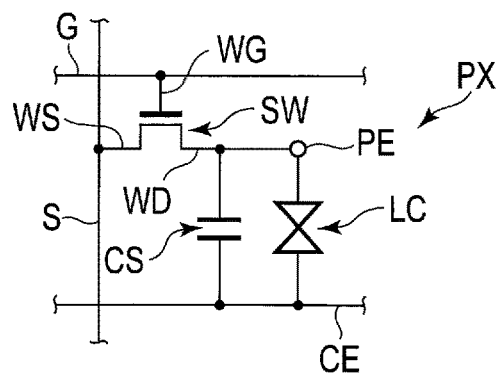

FIG. 7 is a diagram showing a basic structure and an equivalent circuit of the display panel PNL shown in FIG. 6.

The display panel PNL comprises a plurality of pixels PX in the display area DA. Here, each pixel indicates a minimum unit individually controllable according to a pixel signal, and exists in the region containing a switching element provided at a position where a scanning line and a signal line cross each other, for example, which will be described later. The pixels PX are arranged in a matrix along the first direction X and the second direction Y. Further, the display panel PNL comprises a plurality of scanning lines G (G1 to Gn), a plurality of signal lines S (S1 to Sm), common electrodes CE, etc., in the display area DA. The scanning lines G each extend along the first direction X and are arranged along the second direction Y. The signal lines S each extend along the second direction Y and are arranged along the first direction X. The scanning lines G and the signal lines S are not necessarily formed to extend linearly, but may be partially bent. The common electrodes CE are each provided for a plurality of pixels PX. The scanning lines G, the signal lines S and the common electrodes CE are all drawn out to the non-display area NDA. In the non-display area NDA, the scanning lines G are connected to the scanning line drive circuit GD, the signal lines S are connected to the signal line drive circuit SD, and the common electrodes CE are connected to the common electrode drive circuit CD. The signal line drive circuit SD, the scanning line drive circuit GD and the common electrode drive circuit CD may be formed on the first substrate SUB1 or partially or entirely built in the IC chip I1 shown in FIG. 1.

Each pixel PX comprises a switching element SW, a pixel electrode PE, a common electrode CE, a liquid crystal layer LC, etc. The switching element SW is, for example, a thin film transistor (TFT) and is electrically connected to a respective scanning line G and a respective signal line S. More specifically, the switching element PSW comprises a gate electrode WG, a source electrode WS and a drain electrode WD. The gate electrode WG is electrically connected to the scanning line G. In the example illustrated, the electrode electrically connected to the signal line S is referred to as the source electrode WS, and the electrode electrically connected to the pixel electrode PE is referred to as the drain electrode WD.

The scanning line G is connected to the switching element PSW in each of those pixels PX which are arranged along the first direction X. The signal line S is connected to the switching element PSW in each of those pixels PX arranged along the second direction Y. Each of the pixel electrodes PE opposes the respective common electrode CE and drives the liquid crystal layer LC with an electric field produced between the pixel electrode PE and the common electrode CE. A storage capacitor CS is formed, for example, between the common electrode CE and the pixel electrode PE.

Figure 8:
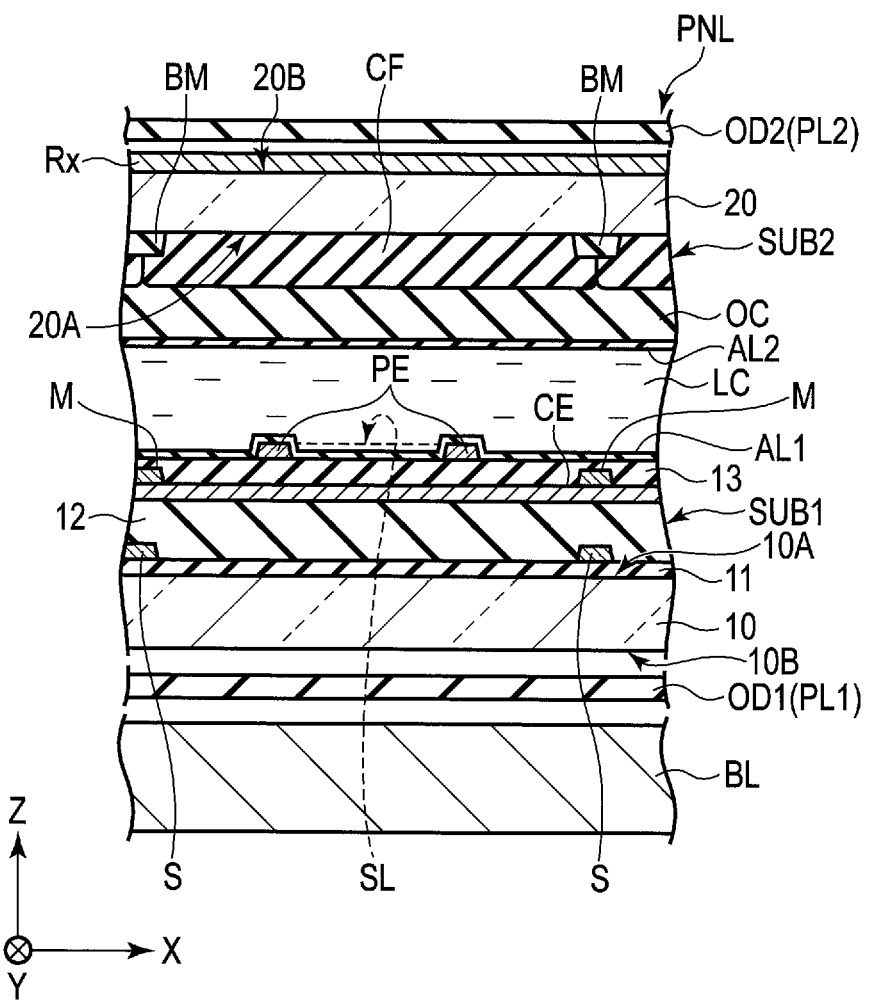
FIG. 8 is a cross-sectional view showing the structure of a part of the display panel shown in FIG. 6.

FIG. 8 is a cross section showing a part of structures of the display panel PNL shown in FIG. 6.

The display panel PNL illustrated here has a structure provided for the display mode which mainly uses a lateral electric field substantially parallel to a surface of the substrate. The display panel PNL may have a structure provided for display mode using a vertical electric field perpendicular to the surface of the substrate, or an electric field oblique to the surface, or a combination thereof. To the display mode using a lateral electric field, for example, such a structure is applicable, that both of the pixel electrode PE and the common electrode CE are provided one of the first substrate SUB1 and the second substrate SUB2. To the display mode using a vertical electric field or an oblique electric field, for example, such a structure is applicable, that one of the pixel electrode PE and the common electrode CE is provided on the first substrate SUB1, and the other one of the pixel electrode PE and the common electrode CE is provided on the second substrate SUB2. Note that the surface of the substrate here is that parallel to the X-Y plane.

The first substrate SUB1 comprises a first basement 10, signal lines S, a common electrode CE, metal layers M, a pixel electrode PE, a first insulating layer 11, a second insulating layer 12, a third insulating layer 13, a first alignment film AL1, etc. Note that the illustration of the switching element, scanning lines and various insulating layers interposed between these, etc., is omitted.

The first insulating layer 11 is located on the surface 10A of the first basement 10. The signal lines S are located on the first insulating layer 11. The second insulating layer 12 is located on the signal lines S and the first insulating layer 11. The common electrode CE is located on the second insulating layer 12. The metal layers M are in contact with the common electrode CE at positions directly above the signal lines S, respectively. In the example illustrated, the metal layers M are located on the common electrode CE, but may be located between the common electrode CE and the second insulating layer 12. The third insulating layer 13 is located on the common electrode CE and the metal layers M. The pixel electrode PE is located on the third insulating layer 13. The pixel electrode PE opposes the common electrode CE via the third insulating layer 13. The pixel electrode PE comprises a slit SL in a position opposing the common electrode CE. The first alignment film AL1 covers the pixel electrode PE and the third insulating layer 13.

The structure of the first substrate SUB1 is not limited to the example illustrated, but the pixel electrode PE may be located between the second insulating layer 12 and the third insulating layer 13 and the common electrode CE may be located between the third insulating layer 13 and the first alignment film AL1. In such a case, the pixel electrode PE is formed into a plate shape without a slit, and the common electrode CE is formed to comprise a slit which opposes the pixel electrodes PE. Alternatively, both of the pixel electrode PE and the common electrode CE may be each formed into a comb teeth shape and arranged to engage with each other in gear.

The second substrate SUB2 comprises a second basement 20, light-shielding layers BM, color filters CF, an overcoat layer OC, a second alignment film AL2, etc.

The light-shielding layers BM and the color filters CF are located in the surface 20A of the second basement 20. The light-shielding layers BM partition the pixels from each other and are located directly above the signal lines S, respectively. The color filters CF oppose the pixel electrodes PE and partially overlap the respective light-shielding layers BM. The color filter CF includes a red color filter, a green color filter, a blue color filter and the like. The overcoat layer OC covers the color filter CF. The second alignment film AL2 covers the overcoat layer OC.

The color filter CF may be disposed on the first substrate SUB1. The color filter CF may include color filters of four or more colors. On a pixel to display a white color, a white color filter or an uncolored resin material may be disposed or the overcoat layer OC may be disposed without disposing the color filter.

The detection electrode Rx is located on the surface 20B of the second basement 20. The detection electrodes Rx may be formed from a conductive layer containing a metal or a transparent conductive material such as ITO or IZO, or formed by depositing a transparent conductive layer on a conductive layer containing a metal, or formed of a conductive organic material or a dispersing element of a fine conductive material or the like.

A first optical element OD1 including a first polarizer PL1 is located between the first basement 10 and an illumination device BL. A second optical element OD2 including a second polarizer PL2 is located on the detection electrodes Rx. Each of the first optical element OD1 and the second optical element OD2 may include a retardation film as needed.

The scanning lines, the signal lines S and the metal layers M are each formed from a metal material such as molybdenum, tungsten, titanium or aluminum and may be formed in a single- or multi-layer structure. For example, the scanning lines are formed of a metal material containing molybdenum and tungsten, the signal lines S are formed of a metal material containing titanium and aluminum, and the metal layer M is formed of a metal material containing molybdenum and aluminum. The common electrodes CE and the pixel electrodes PE are each formed of a transparent conductive material such as ITO or IZO. The first insulating layer 11 and the third insulating layer 13 are inorganic insulating layers while the second insulating layer 12 is an organic insulating layer.

Next, a configuration example of the sensor SS built in the display device DSP of this embodiment will be explained. The sensor SS explained below is, for example, a capacitive sensor of a mutual-capacitive type, which detects contact or approach of an object, based on the variation in electrostatic capacitance between a pair of electrodes opposing via a dielectric.

Figure 9:
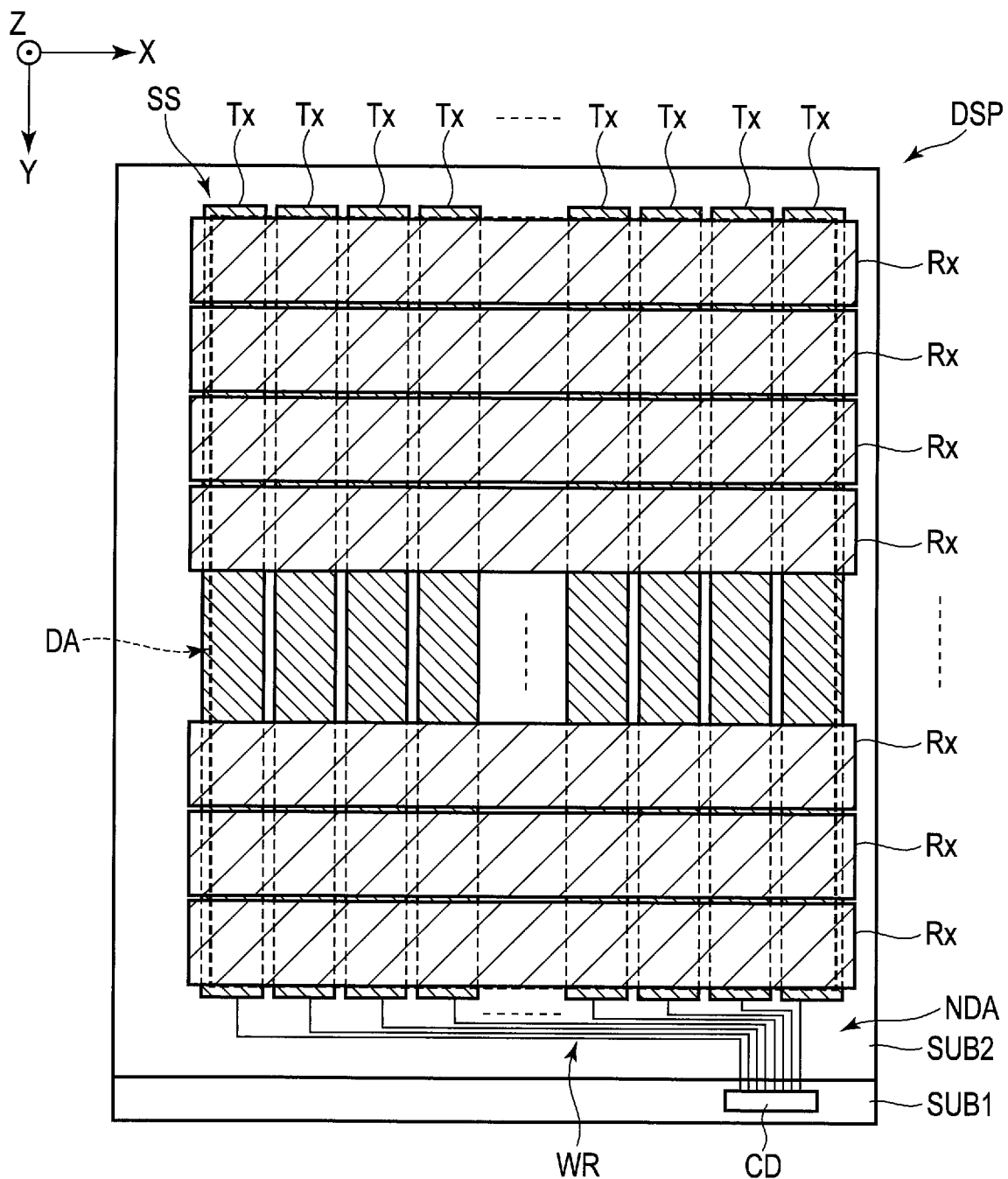
FIG. 9 is a plan view showing a configuration example of a sensor.

FIG. 9 is a plan view showing a configuration example of the sensor SS.

In the configuration example illustrated, the sensor SS comprises sensor drive electrodes Tx and detection electrodes Rx. In the example illustrated, the sensor drive electrodes Tx correspond to portions hatched by lines downwardly slanting to the right and are provided on the first substrate SUB1. The detection electrodes Rx correspond to portions hatched by lines upwardly slanting to the right and are provided on the second substrate SUB2. The drive electrodes Tx and the detection electrodes Rx cross each other in the X-Y plane. The detection electrodes Rx oppose the sensor drive electrodes Tx along the third direction Z.

The sensor drive electrodes Tx and the detection electrodes Rx are located in the display area DA and some of the electrodes extend out to the non-display area NDA. In the example illustrated, the drive electrodes Tx are each formed into a strip shape extending along the second direction Y and arranged along the first direction X to be spaced from each other. The detection electrodes Rx each extend along the first direction X and are arranged along the second direction Y to be spaced from each other. As explained with reference to FIG. 6, the detection electrodes Rx are connected to the first terminal provided on the first substrate SUB1 and electrically connected to the detection circuit RC via the wirings. Each of the sensor drive electrodes Tx is electrically connected to the common electrode drive circuit CD via a wiring WR. The number, size and shape of the sensor drive electrodes Tx and the detection electrodes Rx are not particularly limited but can be variously changed.

The sensor drive electrodes Tx each function as the above-described common electrode CE. In other words, they have a function of generating an electric field between itself and the respective pixel electrode PE and also a function of detecting the position of the object by generating the capacitance between itself and the respective detection electrode Rx.

The common electrode driving circuit CD supplies common drive signals to the drive electrodes Tx including the common electrode CE at the display driving time to display images on the display area DA. Further, the common electrode drive circuit CD supplies sensor drive signals to the sensor drive electrodes Tx at the sensing driving time to execute sensing. The detection electrodes Rx generate electrostatic capacitance between the sensor drive electrodes Tx and themselves in accordance with supply of the sensor drive signals to the sensor drive electrodes Tx. The electrostatic capacitance varies as an object to be detected such as a finger approaches. From the detection electrodes Rx, the detection signals based on the electrostatic capacitance are output. The detection signals output from the detection electrodes Rx are input to the detection circuit RC shown in FIG. 6.

The sensor SS in each of the above-explained configuration examples is not limited to the sensor of the mutual-capacitive type which detects objects based the variation in electrostatic capacitance between a pair of electrodes (in the above case, the electrostatic capacitance between the drive electrodes Tx and the detection electrodes Rx), but may be a self-capacitive type which detects objects based on the variation in electrostatic capacitance between the detection electrodes Rx.

In the example illustrated, the sensor drive electrodes Tx each extend along the second direction Y and arranged along the first direction X with a gap between each adjacent pair, but the sensor drive electrodes Tx each may extend along the first direction X and arranged along the second direction Y with a gap between each adjacent pair. In this case, the detection electrodes Rx each extend along the second direction Y and are arranged along the first direction X with a gap between each adjacent pair.

FIG. 10 is a cross-sectional view showing the display panel PNL including the first hole V1 shown in FIG. 6 as taken along in line A-B. Here, only main parts necessary for the explanation are shown, and the first and second alignment films and the like are omitted from the illustration. Further, the structure shown in FIG. 10 is a specific example of that shown in FIG. 1, and explanation of the members overlapping those of FIG. 1 will be omitted. Note that FIG. 1 shows a cross section in the Y-Z plane, whereas FIG. 10 shows a cross section in the X-Z plane.

In the example illustrated, the display device DSP comprises a first substrate SUB1, a second substrate SUB2, a sealing material SE, a liquid crystal layer LC, a connecting material C and a filling material FI.

The first substrate SUB1 includes a first basement 10, a first terminal TM1, wirings W, a first insulating layer 11, a second insulating layer 12, a third insulating layer 13, a third terminal TM3, etc.

The first insulating layer 11 comprises an insulating layer 111, an insulating layer 112 and an insulating layer 113. The insulating layer 111, the insulating layer 112, and the insulating layer 113 are stacked in this order on the first basement 10. The first insulating layer 11 comprises a concavity GR. In the example illustrated, the concavity GR penetrates the insulating layers 112 and 113 to the insulating layer 111. Although will not be explained in detail, the semiconductor layer of the switching element is disposed between the insulating layer 111 and the insulating layer 112 in the display area, and the scanning lines G shown in FIG. 7 are disposed between the insulating layer 112 and the insulating layer 113.

In the example illustrated, the first terminal TM1 is located on the surface 10A side of the first basement 10, and disposed inside the concavity GR. In other words, the first terminal TM1 is in contact with the insulating layer 111. The wirings W are arranged on the insulating layer 113. Here, the wirings W are located in the same layer as that of the signal lines formed in the display area, for example. In this embodiment, the first terminal TM1 is formed together with, for example, the signal lines S shown in FIG. 7 at once from the same material. The second insulating layer 12 covers the first terminal TM1 and the wirings W and is disposed also on the insulating layer 113. The third insulating layer 13 is disposed on the second insulating layer 12.

Note that the concavity GR may penetrate the insulating layer 111 to the first basement 10 in the position where the concavity GR overlaps the insulating layer 111, and the first terminal TM1 disposed inside the concavity GR may be in contact with the first basement 10.

The third terminal TM3 is located between the second insulating layer 12 and the sealing material SE. The third terminal TM3 is electrically connected to the first terminal TM1 via a contact hole CH which penetrates the second insulating layer 12 to the first terminal TM1. The third terminal TM3 with such configuration is located in the same layer as that of the metal layer M described with reference to FIG. 8. The third terminal TM3 is formed together with, for example, the metal layer M shown in FIG. 8 at once from the same material.

The second substrate SUB2 comprises a second basement 20, a second terminal TM2, detection electrodes Rx, a light-shielding layer BM, an overcoat layer OC, etc.

The light-shielding layer BM is located on the surface 20A of the second basement 20. The overcoat layer OC covers the light-shielding layer BM.

The sealing material SE is located between the first substrate SUB1 and the second substrate SUB2. The liquid crystal layer LC is located in the region surrounded by the first substrate SUB1, the second substrate SUB2 and the sealing material SE. In the example illustrated, the light shielding layer BM, the overcoat layer OC and the sealing material SE correspond to the organic insulating layer OI.

Although will not be illustrated, the first alignment film may be provided on a sealing material SE side of the first substrate SUB1. Further, the second alignment film may be provided on a sealing material SE side of the second substrate SUB2.

The first terminal TM1 and the second terminal TM2 are formed of a metal material such as molybdenum, tungsten, titanium, aluminum, silver, copper or chromium, or an alloy of any combination of these, or a transparent conductive material such as an indium tin oxide (ITO) or an indium zinc oxide (IZO), and may be of a single- or multi-layer structure. The first terminal TM1 is formed from a metal material containing, for example, aluminum and it is preferable in terms of manufacturing process not to use a metal material containing a material with higher melting point as compared to that of aluminum, which is, for example, molybdenum or tungsten.

In the example illustrated, the hole portion VA1 penetrates the second terminal TM2 and the second basement 20, the hole portion VB1 penetrates the light-shielding layer BM, the overcoat layer OC and the sealing material SE, and the hole portion VC1 penetrates the third terminal TM3, the second insulating layer 12, the first terminal TM1 and the insulating layer 111.

In the example illustrated, the third terminal TM3 projects out in the first hole V1. With this structure, the contact area between the third terminal TM3 and the connecting material C can be increased in the first hole V1. Thus, it is possible to improve the reliability of the conduction between the connecting material C and the first terminal TM1 via the third terminal TM3.

FIG. 11 is a plan view showing a configuration example of the detection electrodes Rx and the second terminal TM2 shown in FIG. 6.

In the example shown in FIG. 11, part (A), the display device DSP comprises second terminal portions TM21 and TM22, connection wirings CW1 and CW2 and a detection electrode Rx. The second terminal portions TM21 and TM22 are each formed in a ring shape. The second terminal TM21 is connected to the detection electrode Rx via the connection wiring CW1. The second terminal TM22 is connected to the detection electrode Rx via the connection wiring CW2. The detection electrode Rx is formed from meshed metal thin wires MS. An opening OP1 is formed on an inner side of the second terminal TM21. An opening OP2 is formed on an inner side of the second terminal TM22. The openings OP1 and OP2 are arranged along the second direction Y and spaced from each other in plan view. That is, the first hole V1 and the second hole V2 are communicated to each other inside, but the openings OP1 and OP2 thereof are spaced from each other.

As will be explained later, the connecting material C is injected to one of the first hole V1 and the second hole V2 and an air bubble is emitted from the other while forming the connecting material C. In the example illustrated, both of the first hole V1 and the second hole V2 are formed as holes to connect the first and second terminal portions TM21 and TM22 to each other. In such a case, the first hole V1 and the second hole V2 are formed simultaneously, for example.

The structure shown in FIG. 11, part (B) is different from that of FIG. 11, part (A) in that a second terminal portion TM22 connected to the detection electrode Rx is not provided in the vicinity of the second hole V2.

In the example illustrated, the first hole V1 is formed as a hole to connect the first terminal and the second terminal portion TM21 to each other. With such a structure, in case of a continuity error of the connecting material C occurring, for example, in the first hole V1, if the connecting material C is injected from the second hole V2, the connecting material C is continuously formed inside the first hole V1, thereby making it possible to recover the conduction error. More specifically, when the first hole V1 and the connecting material C are once formed, they are subjected to inspection of the continuity of the connecting material C in the first hole V1. If, here, a continuity error is found, the second hole V2 is formed.

Note that the shape of the detection electrode Rx is not limited to that illustrated in the example, but may be, for example, wavy, or some other shape such as sawtooth or sine wave.

Moreover, FIG. 11 corresponds to the structure in which the openings OP1 and OP2 are spaced from each other, as shown in FIGS. 1 to 3.

FIG. 12 is a plan view showing another example of the detection electrode Rx and the second terminal TM2 shown in FIG. 6. The structure shown in FIG. 12 is different from that of FIG. 11, part (B) in the position of the second hole V2.

FIG. 12 shows the case where the second hole V2 penetrates from the outer end portion OIE of the organic insulating layer OI to the first hole V1, as shown in FIG. 5. Here, the opening OP2 is located in the outer end portion OIE.

FIG. 13 is a plan view showing another example of the detection electrode Rx and the second terminal TM2 shown in FIG. 6. The structure shown in FIG. 13 is different from that of FIG. 11, part (B) in that the opening OP2 is communicated to the opening OP1.

FIG. 13 shows the case where the first hole V1 and the second hole V2 are communicated to each other as shown in FIG. 4. More specifically, the openings OP1 and OP2 are communicated to and partially overlap each other in plan view. Note that the second terminal TM21 is interrupted in a position which overlaps the opening OP2, for example.

Next, an example of the method of manufacturing the display device DSP described above will be described with reference to FIGS. 14 to 16.

FIGS. 14 to 16 illustrate a method of manufacturing the display device DSP shown in FIG. 3. Note that FIG. 14 shows a processing step after a part of the protection material PT disposed on the second terminal TM2 is removed by laser beam.

As shown in FIG. 14, laser beam LL1 is irradiated from above the second substrate SUB2. As the laser beam source, for example, a carbon dioxide gas laser is applicable, but various devices, as long as being able to drill a hole in a glass material or organic material, may be used as well, including an excimer laser device. With the irradiating of the laser beam LL1, the first hole V1 is formed. Subsequently, the second hole V2 is formed by irradiating laser beam LL2 from above the second substrate SUB2. The laser beams LL1 and LL2 are the same laser beams. With the irradiation of the laser beam LL1, the hole portion VB1 formed in the organic insulating layer OI is expanded along the X-Y directions with respect to the hole portions VA1 and VC1. Further, with the irradiation of the laser beam LL2, the hole portion VB2 formed in the organic insulating layer OI is expanded along the X-Y direction with respect to the hole portions VA2 and VC2. Thus, the hole portions VB1 and VB2 are communicated to each other. That is, the first hole V1 and the second hole V2 can be communicated to each other in the layer where the organic insulating layer OI is located.

Then, as shown in FIG. 15, the connecting material C which electrically connects the first terminal TM1 and the second terminal TM2 to each other is formed. First, a conductive material CM is injected into the second hole V2. Here, the conductive material CM is injected to the second hole V2 along a direction a, and an air bubble BB is emitted to the outside of the first hole V1 along a direction b. That is, the conductive material CM is injected to from the second hole V2, and the air bubble BB is emitted from the first hole V1.

Thereafter, as shown in FIG. 16, as the solvent contained in the conductive material CM evaporates, the volume of the conductive material CM decreases. As a result, fine particles of the metal material in the conductive material CM remain as a coat on the inner surfaces of the first hole V1 and the second hole V2, and hollow portion are formed in the first hole V1 and the second hole V2. In the example illustrated, the connecting material C thus formed is in contact with the inner surface of the second hole V2, and further, in the first hole V1, is in contact with the inner surface of the concavity CC1, the inner surface of the hole portion VC1 and the inner surface of the hole portion VB1.

Note that in the processing step shown in FIG. 15, the conductive material CM may be injected to from the first hole V1, and the air bubbles BB may be emitted from the second hole V2. Further, in the processing step shown in FIG. 16, it suffices if the connecting material C connects the first terminal TM1 and the second terminal TM2 to each other by either one of the first hole V1 and the second hole V2, or may be formed continuously in the inner surface of the first hole V1. Furthermore, the connecting material C may be formed continuously in both of the first hole V1 and the second hole V2. In this case, the first hole V1 and the second hole V2 both function as holes to connect the first terminal TM1 and the second terminal TM2 to each other.

Note that in the example shown in FIG. 14, the first hole V1 and the second hole V2 are formed in the same processing step. But, as will be described later, after the connecting material C is formed in the first hole V1, the connecting material C may be subjected to inspection of the continuity state to check a continuity error before the second hole V2 is formed.

According to this embodiment, the display device DSP has the second hole V2 in addition to the first hole V1. The second hole V2 penetrates at least one of the second basement 20 and the organic insulating layer OI so as to communicate to the first hole V1. With this structure, to form the connecting material C, the connecting material C is injected to from either one of the first hole V1 and the second hole V2, and the air bubble BB is emitted from the other one. Therefore, it is possible to suppress the decrease in the production yield of the connecting material C, which may be caused if the air bubble BB remains therein. Thus, the occurrence of continuity error between the first terminal TM1 and the second terminal TM2 can be suppressed.

Moreover, for example, if a continuity error due to insufficient filling or hardening of the connecting material C occurs in the first hole V1, the second hole V2 is formed to reforming the connecting material C, thereby making it possible to recover the continuity error. Thus, the reliability of connection between the first terminal TM1 and the second terminal TM2 can be improved.

Further, as compared to the example in which a wiring substrate SUB4 is mounted in the second substrate SUB2 in addition to the wiring substrate SUB3 mounted in the first substrate SUB1, this embodiment no longer requires the terminal for mounting the wiring substrate SUB4 or the routing line for connecting the second terminal TM2 and the wiring substrate SUB4 to each other. Therefore, the size of the second substrate SUB2 in the X-Y plane defined by the first direction X and the second direction Y can be reduced, and also the width of the frame in the peripheral portion of the display device DSP can be decreased. Further, the cost for the wiring substrate SUB4, which is no longer necessary, can be reduced. Thus, the width of the frame can be reduced and a low-cost can be achieved.

Next, another example of the method of manufacturing the display device DSP described above will be described with reference to FIGS. 17 to 19.

Figure 18:
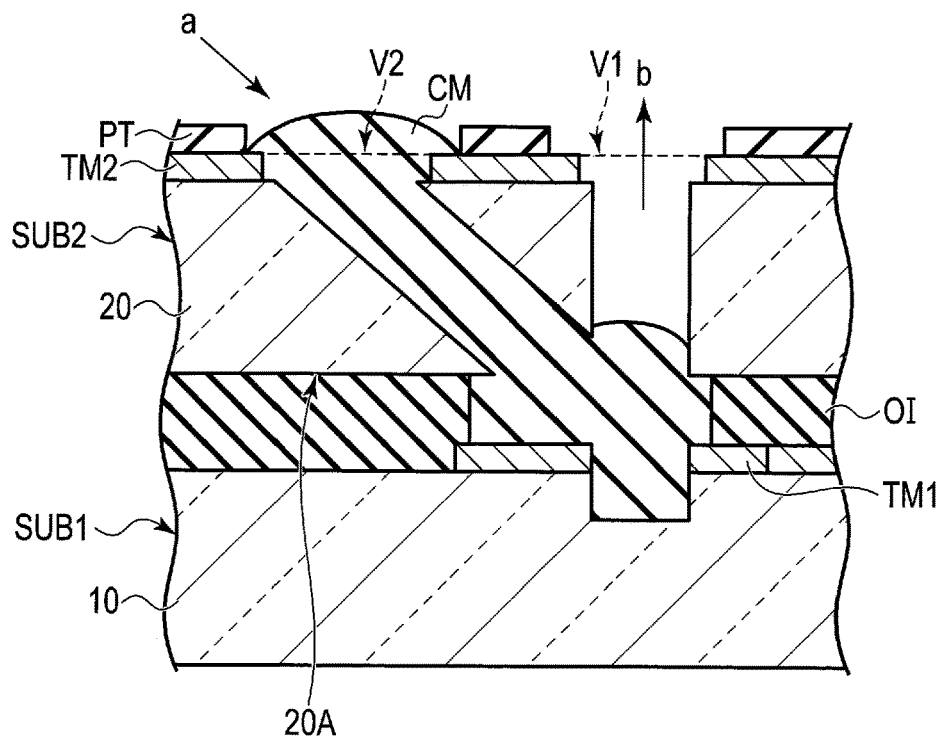
FIG. 18 is a diagram showing a next step of the method of manufacturing the display device shown in FIG. 1.
Figure 19:
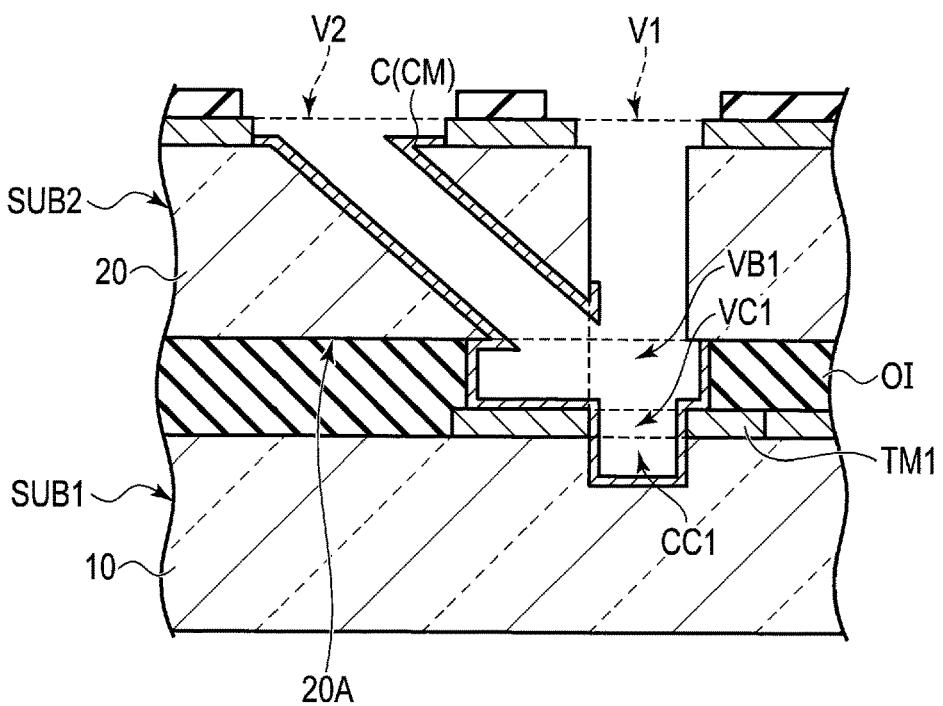
FIG. 19 is a diagram showing a next step of the method of manufacturing the display device shown in FIG. 1.

FIGS. 17 to 19 illustrate a method of manufacturing the display device DSP shown in FIG. 1.

As shown in FIG. 17, laser beam LL1 is irradiated from above the second substrate SUB2 and thus the first hole V1 is formed. Subsequently, laser beam LL2 is irradiated from above the second substrate SUB2, and thus the second hole V2 is formed. The laser beam LL2 is irradiated in a direction inclined with respect to the third direction Z. Thus, the second hole V2 is communicated to the hole portions VA1 and VB1.

Then, as shown in FIG. 18, the connecting material C is formed. First, a conductive material CM is injected to the second hole V2. Here, the conductive material CM is injected to the second hole V2 along a direction a, and an air bubble BB is emitted to the outside of the first hole V1 along a direction b. In other words, the conductive material CM is injected to from the second hole V2, and the air bubble BB is emitted from the first hole V1. Note that the conductive material CM may be injected to from the first hole V1, and the air bubble BB may be emitted from the second hole V2.

Thereafter, as shown in FIG. 19, the solvent contained in the conductive material CM is removed and the volume of the conductive material CM decreases, thus forming a hollow portion. In the example illustrated, the connecting material C thus formed is in contact with the inner surface of the second hole V2, and further, in the first hole V1, is in contact with the inner surface of the concavity CC1, the inner surface of the hole portion VC1 and the inner surface of the hole portion VB1. Note that the connecting material C may be formed continuously on the inner surface of the first hole V1, or formed continuously in both of the first hole V1 and the second hole V2. Further, the second hole V2 may be formed after checking an continuity error of the connecting material C in the first hole V1.

Next, another example of the method of manufacturing the display device DSP described above will be described with reference to FIGS. 20 to 23.

FIGS. 20 to 23 illustrate a method of manufacturing the display device DSP shown in FIG. 5.

As shown in FIG. 20, laser beam LL3 is irradiated from the outer end portion OIE side towards the organic insulating layer OI and thus the second hole V2 is formed. The laser beam LL3 is the same as, for example, the laser beams LL1 and LL2.

Subsequently, as shown in FIG. 21, laser beam LL1 is irradiated from above the second substrate SUB2, and thus the first hole V1 is formed. The laser beam LL1 is irradiated on a position overlapping the second hole V2 along the third direction Z. Thus, the second hole V2 is communicated to the first hole V1.

Then, as shown in FIG. 22, the connecting material C is formed. First, a conductive material CM is injected to the first hole V1. Here, the conductive material CM is injected to the first hole V1 along a direction a, and an air bubble BB is emitted to the outside of the second hole V2 along a direction b. In other words, the conductive material CM is injected to from the first hole V1, and the air bubble BB is emitted from the second hole V2.

Thereafter, as shown in FIG. 23, the solvent contained in the conductive material CM is removed and the volume of the conductive material CM decreases, thus forming a hollow portion. In the example illustrated, the connecting material C thus formed is in contact with the inner surface of the first hole V1. Note that the second hole V2 is formed into, for example, a conical shape. Here, the diameter of a tip portion TP of the second hole V2 is formed so small to such an extent that the connecting material C does not leak out.

Next, another example of the method of manufacturing the display device DSP described above will be described with reference to FIGS. 24 to 27.

FIGS. 24 to 27 illustrate a modification of the method of manufacturing the display device DSP shown in FIG. 3.

Note that FIG. 24 shows a processing step after the first hole V1 is formed and then the connecting material C is formed in the first hole V1. In the example illustrated, the connecting material C is formed on the inner surface of the hole portion VA1. That is, the connecting material C is not formed continuously between the first terminal TM1 and the second terminal TM2 in the first hole V1. Here, when the connecting material C is formed in the first hole V1, the continuity between the first terminal TM1 and the second terminal TM2 is inspected. A continuity error is detected in such a state as illustrated in the drawing.

Then, as shown in FIG. 25, a laser beam LL2 is irradiated from above the second substrate SUB2, and thus the second hole V2 is formed. Thus, the first hole V1 and the second hole V2 can be communicated to each other in the layer where the organic insulating layer OI is located. Here, the second hole V2 is formed in a place only a distance DT spaced from the first hole V1. In this embodiment, the distance DT is, for example, about 100 μm.

Then, as shown in FIG. 26, the connecting material C is formed. First, a conductive material CM is injected to the second hole V2. Here, the conductive material CM is injected to the second hole V2 along a direction a, and an air bubble BB is emitted to the outside of the first hole V1 along a direction b. In other words, the conductive material CM is injected to from the second hole V2, and the air bubble BB is emitted from the first hole V1. Note that the conductive material CM may be injected to from the first hole V1, and the air bubbles BB may be emitted from the second hole V2.

Thereafter, as shown in FIG. 27, the solvent contained in the conductive material CM is removed and the volume of the conductive material CM decreases, thus forming a hollow portion. In the example illustrated, the connecting material C thus formed is in contact with the inner surface of the second hole V2, and also in contact with the inner surface of the concavity CC 1, the inner surface of hole portion VC1 and the inner surface of hole portion VB1 in the first hole V1. Note that the connecting material C may be formed continuously with the connecting material C previously formed in the first hole V1, or may be formed only in the first hole V1.

As described above, according to this embodiment, a display device with a frame whose width is reducible can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising a first basement and a first terminal;
a second substrate opposing the first substrate and comprising a second basement and a second terminal;
an organic insulating layer located between the first basement and the second basement;
a first hole penetrating the second basement and the organic insulating layer;
a second hole penetrating at least one of the second basement and the organic insulating layer and communicating to the first hole;
a connecting material provided on at least one of the first hole and the second hole to electrically connect the first terminal and the second terminal to each other; and
a detection electrode connected to the second terminal and extending along a first direction, wherein
the first hole has a first opening at a upper surface of the second substrate,
the second hole has a second opening at the upper surface, and
the first opening and the second opening are arranged along a second direction which crosses the first direction.

2. The device of claim 1, wherein
a central axis of the second hole is inclined with respect to a central axis of the first hole.

3. The device of claim 2, wherein
the first hole comprises a first hole portion penetrating the second basement, and
the second hole penetrates from an upper surface of the second basement to the first hole portion.

4. The device of claim 2, wherein
the second hole penetrates the second basement and the organic insulating layer.

5. The device of claim 1, wherein
the first hole comprises a first hole portion penetrating the second basement and a second hole portion penetrating the organic insulating layer,
the second hole comprises a third hole portion penetrating the second basement and a fourth hole portion penetrating the organic insulating layer, and
the first hole portion and the third hole portion are spaced apart from each other and the second hole portion and the fourth hole portion are communicated to each other.

6. The device of claim 1, wherein
the first opening and the second opening are spaced apart from each other in plan view.

7. The device of claim 1, wherein
the first opening and the second opening are partially communicated to each other in plan view.

8. The device of claim 1, wherein
the second hole penetrates the organic insulating layer between an outer end portion of the organic insulating layer and the first hole.

9. An inter-substrate conducting structure comprising:
a first substrate comprising a first basement and a first terminal;
a second substrate opposing the first substrate and comprising a second basement and a second terminal;
an organic insulating layer located between the first basement and the second basement;
a first hole penetrating the second basement and the organic insulating layer;
a second hole penetrating at least one of the second basement and the organic insulating layer and communicating to the first hole;
a connecting material provided on at least one of the first hole and the second hole to electrically connect the first terminal and the second terminal to each other; and
a detection electrode connected to the second terminal and extending along a first direction, wherein
the first hole has a first opening at the upper surface of the second substrate,
the second hole has a second opening at the upper surface, and
the first opening and the second opening are arranged along a second direction which crosses the first direction.

10. The structure of claim 9, wherein
a central axis of the second hole is inclined with respect to a central axis of the first hole.

11. The structure of claim 10, wherein
the first hole comprises a first hole portion penetrating the second basement, and
the second hole penetrates from an upper surface of the second basement to the first hole portion.

12. The structure of claim 10, wherein
the second hole penetrates the second basement and the organic insulating layer.

13. The structure of claim 9, wherein
the first hole comprises a first hole portion penetrating the second basement and a second hole portion penetrating the organic insulating layer,
the second hole comprises a third hole portion penetrating the second basement and a fourth hole portion penetrating the organic insulating layer, and
the first hole portion and the third hole portion are spaced apart from each other and the second hole portion and the fourth hole portion are communicated to each other.

14. The structure of claim 9, wherein
the first opening and the second opening are spaced apart from each other in plan view.

15. The structure of claim 9, wherein
the first opening and the second opening are partially communicated to each other in plan view.

16. The structure of claim 9, wherein
the second hole penetrates the organic insulating layer between an outer end portion of the organic insulating layer and the first hole.

17. A display device comprising:
a first substrate comprising a first basement and a first terminal;
a second substrate opposing the first substrate and comprising a second basement and a second terminal;
an organic insulating layer located between the first basement and the second basement;
a first hole penetrating the second basement and the organic insulating layer;
a second hole penetrating the organic insulating layer and communicating to the first hole; and
a connecting material provided on at least the first hole to electrically connect the first terminal and the second terminal to each other, wherein
the first basement has a first side edge, and second basement has a second side edge, and the organic insulating layer has a third side edge, the first to third side edge flush with each other,
the first hole has a first opening at a upper surface of the second substrate, and
the second hole has a second opening at the third edge.

18. An inter-substrate conducting structure comprising:
a first substrate comprising a first basement and a first terminal;
a second substrate opposing the first substrate and comprising a second basement and a second terminal;
an organic insulating layer located between the first basement and the second basement;
a first hole penetrating the second basement and the organic insulating layer;
a second hole penetrating the organic insulating layer and communicating to the first hole; and
a connecting material provided on at least the first hole to electrically connect the first terminal and the second terminal to each other, wherein
the first basement has a first side edge, and second basement has a second side edge, and the organic insulating layer has a third side edge, the first to third side edge flush with each other,
the first hole has a first opening at a upper surface of the second substrate, and
the second hole has a second opening at the third edge.

* * * * *